(12) United States Patent
Guo et al.

(10) Patent No.: US 10,732,472 B2
(45) Date of Patent: Aug. 4, 2020

(54) DISPLAY PANEL AND DISPLAY DEVICE

(71) Applicant: WUHAN TIANMA MICRO-ELECTRONICS CO., LTD., Wuhan (CN)

(72) Inventors: Linshan Guo, Wuhan (CN); Tianqing Hu, Shanghai (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 16/225,677

(22) Filed: Dec. 19, 2018

(65) Prior Publication Data

US 2020/0103716 A1    Apr. 2, 2020

(30) Foreign Application Priority Data

Sep. 29, 2018 (CN) .......................... 2018 1 1149825

(51) Int. Cl.
| | |
|---|---|
| G06F 3/041 | (2006.01) |
| G02F 1/1362 | (2006.01) |
| G02F 1/1333 | (2006.01) |
| G02F 1/1335 | (2006.01) |
| G06F 3/047 | (2006.01) |
| G06F 3/044 | (2006.01) |

(52) U.S. Cl.
CPC .... *G02F 1/136286* (2013.01); *G02F 1/13338* (2013.01); *G02F 1/133305* (2013.01); *G02F 1/133308* (2013.01); *G02F 1/133526* (2013.01); *G06F 3/047* (2013.01); *G06F 3/044* (2013.01); *G06F 3/0412* (2013.01)

(58) Field of Classification Search
CPC ...... G06F 3/047; G06F 3/0425; G06F 3/0428; G06F 3/044; G06F 3/045
See application file for complete search history.

(56) References Cited

U.S. PATENT DOCUMENTS

| | | | |
|---|---|---|---|
| 9,001,010 B2* | 4/2015 | Jeon .......................... | G06F 1/00 345/108 |
| 9,824,612 B2* | 11/2017 | Hu .......................... | G09G 3/003 |
| 10,474,282 B2* | 11/2019 | Park ....................... | G06F 1/1692 |
| 2014/0118319 A1* | 5/2014 | Jeon .......................... | G06F 1/00 345/207 |
| 2017/0285844 A1* | 10/2017 | Park ........................ | G06F 3/044 |
| 2019/0187513 A1* | 6/2019 | Jin ....................... | H01L 51/5284 |

FOREIGN PATENT DOCUMENTS

| | | |
|---|---|---|
| CN | 101241283 A | 8/2008 |
| CN | 104635395 A | 5/2015 |
| CN | 104952883 A | 9/2015 |

* cited by examiner

Primary Examiner — Vijay Shankar
(74) Attorney, Agent, or Firm — Anova Law Group PLLC

(57) ABSTRACT

A display panel and a display device are provided. The display panel includes a display region and at least one notch. The display region is divided into a first display region and a second display region by a first bending axis. The first bending axis extends along a column direction. The first display region includes a first edge and a plurality of first data lines, wherein the first edge and the plurality of first data lines extend along the column direction. The first edge is recessed toward an inside of the first display region to form the at least one notch. The plurality of first data lines and the second display region are disposed on two opposite sides of the at least one notch along a row direction.

20 Claims, 21 Drawing Sheets

DISPLAY PANEL AND DISPLAY DEVICE

CROSS-REFERENCES TO RELATED APPLICATION

This application claims the priority of Chinese Patent Application No. 201811149825.4, filed on Sep. 30, 2018, the content of which is incorporated herein by reference in its entirety.

TECHNICAL FIELD

The present disclosure generally relates to the field of display technology and, more particularly, relates to a display panel and a display device.

BACKGROUND

As technologies develop for display devices, consumers have higher and higher demands on an appearance and functions of display devices. A display device usually adopts a display panel including a liquid crystal display panel or an organic light-emitting display panel. A screen ratio of the display device is hard to be improved further because of limits in current technologies.

One the other hand, the display devices often have one display mode and cannot meet display needs with a large diversity for occasions of entertainments, offices, and so on.

The disclosed display panel and the display device are directed to solve one or more problems set forth above and other problems in the art.

SUMMARY

One aspect of the present disclosure provides a display panel. The display panel comprises a display region and at least one notch. The display region is divided into a first display region and a second display region by a first bending axis. The first bending axis extends along a column direction. The first display region includes a first edge and a plurality of first data lines, wherein the first edge and the plurality of first data lines extend along the column direction. The first edge is recessed toward an inside of the first display region to form the at least one notch. The plurality of first data lines and the second display region are disposed on two opposite sides of the at least one notch along a row direction respectively.

Another aspect of the present disclosure provides a display device. The display device includes a display panel. The display panel comprises a display region and at least one notch. The display region is divided into a first display region and a second display region by a first bending axis. The first bending axis extends along a column direction. The first display region includes a first edge and a plurality of first data lines, wherein the first edge and the plurality of first data lines extend along the column direction. The first edge is recessed toward an inside of the first display region to form the at least one notch. The plurality of first data lines and the second display region are disposed on two opposite sides of the at least one notch along a row direction respectively.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
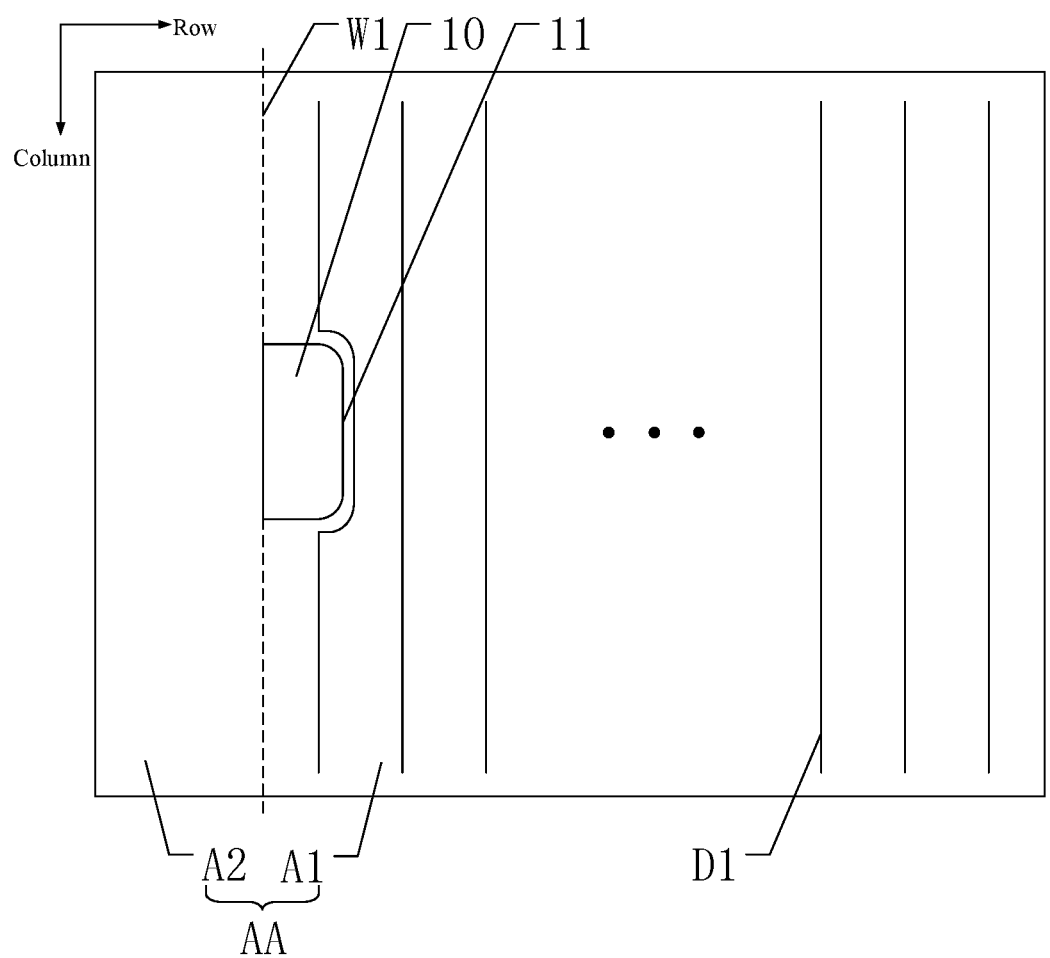
FIG. 1 illustrates an exemplary display panel consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the invention. Furthermore, a three-dimensional (3D) size including length, width and depth should be considered during practical fabrication.

The present disclosure provides a display panel. The display panel may include a display region and at least one notch. The display region may be divided into a first display region and a second display region by a first bending axis. The first bending axis may extend along a column direction. The first display region may include a first edge and a plurality of first data lines. The first edge and the plurality of first data lines may extend along the column direction. The first edge may be recessed toward an inside of the first display region to form the at least one notch. The plurality of first data lines and the second display region may be disposed on two opposite sides of the notch along a row direction respectively. Display modes of the display panel may be more diverse, and the display panel may have a narrow border.

FIG. 1 illustrates an exemplary display panel consistent with various disclosed embodiments in the present disclosure. The display panel may include a display region AA and at least one notch 10. The display region AA may be divided into a first display region A1 and a second display region A2 by a first bending axis W1. The first bending axis W1 may extend along a column direction. The first display region A1 may include a first edge 11 and a plurality of first data lines D1. The first edge 11 and the plurality of the first data lines may extend along the column direction.

The first edge 11 may be recessed toward an inside of the first display region A1, to form the notch 10. The plurality of data lines D1 and the second display region A2 may be disposed on two opposite sides of the notch 10 along a row direction.

Figure 2:
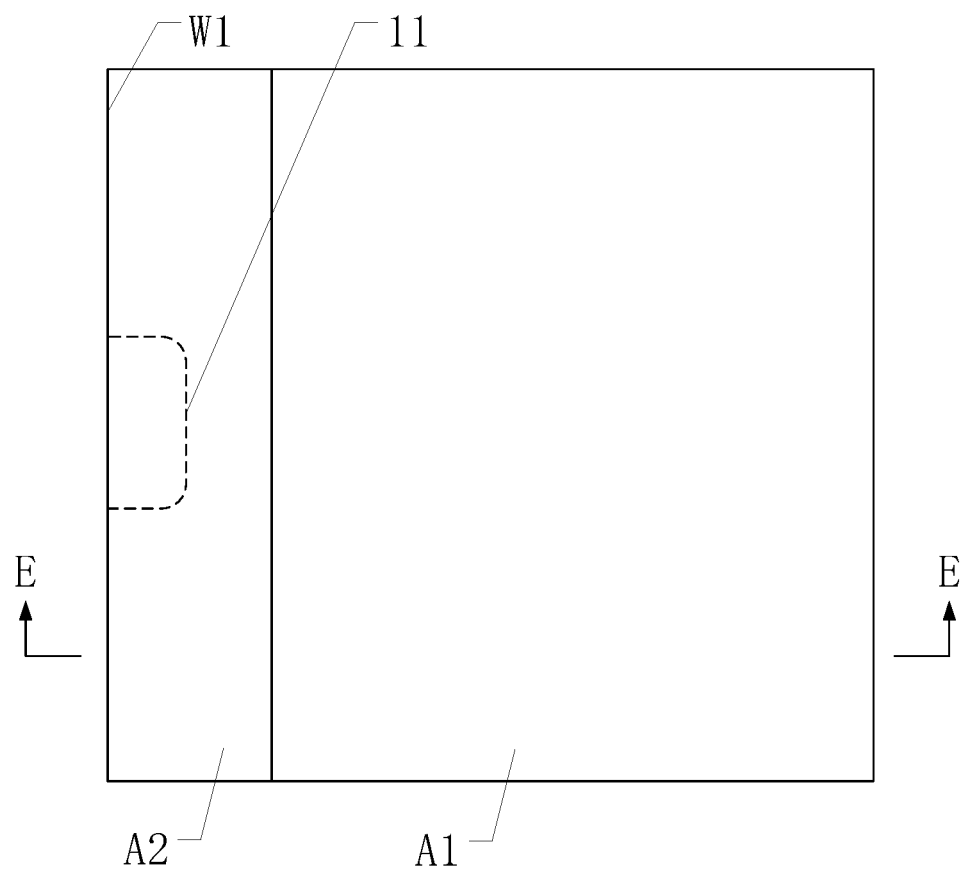
FIG. 2 illustrates a planar structure of the display panel in FIG. 1 after bending consistent with various disclosed embodiments in the present disclosure.
Figure 3:
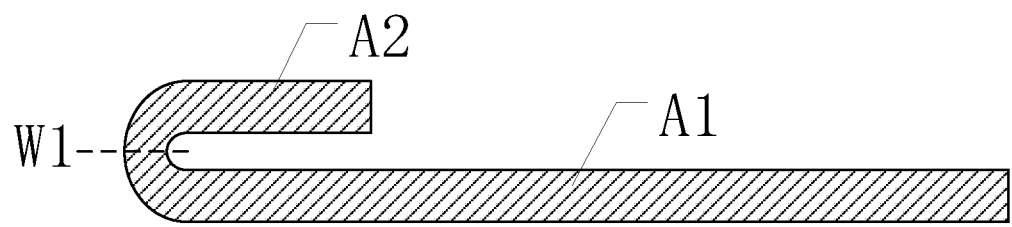
FIG. 3 illustrates a cross-section view of the display panel in FIG. 2 along an E-E direction consistent with various disclosed embodiments in the present disclosure.
Figure 4:
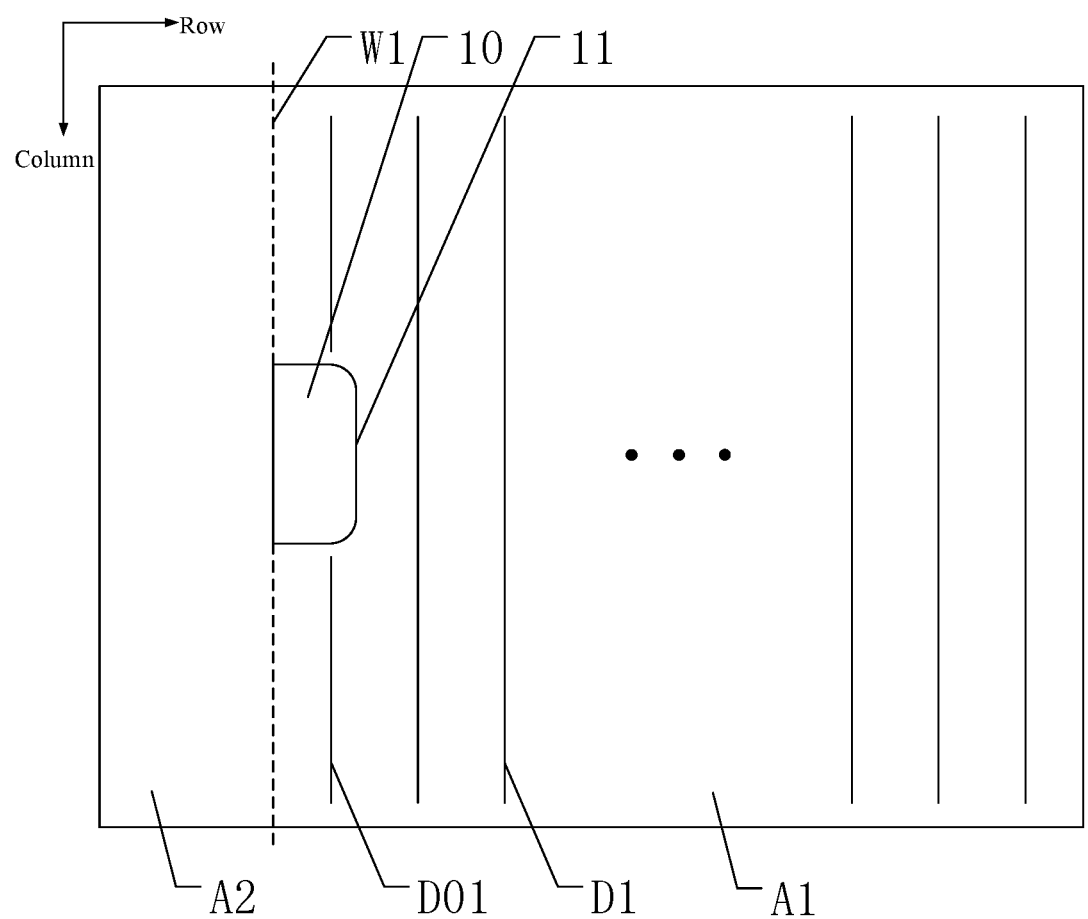
FIG. 4 illustrates another exemplary display panel consistent with various disclosed embodiments in the present disclosure.

As illustrated in FIGS. 2-3, the second display region A2 may be bent along the first bending axis W1 toward a front of the first display region A1. In one embodiment, the display panel may be a flexible display panel which is easy to be bent. In other embodiments, the display panel may be any display panel as long as a display region where the first bending axis W1 is disposed can be bent. For description purpose only, the embodiment of the present disclosure is described by using a display panel where the second display region A2 is bent along the first bending axis W1 toward the front of the first display region A1 as an example. The second display region A2 may also be bent along the first bending axis W1 toward a back of the first display region A1, and the present disclosure has no limit on this.

After bending the display region AA along the first bending axis W1, a space that the display device occupies may be reduced, and the display device may be stored and carried more easily. Display modes of the display device may be increased also. For example, users can choose to watch images displayed in the first display region A1 or in the second display region A2. The first display region A2 and the second display region A2 may also be used as mosaic display region to display images together. The display device may be configured in any suitable display mode according to an actual requirement. The present disclosure has no limit on this.

The first edge 11 extending along the column direction may be recessed toward the inside of the first display region A1 to form the notch 10. Cameras, microphones, and other devices may be disposed in the notch 10, to meet users' needs for the display device to take photos and/or receive voice signals. Buttons such as volume buttons and power buttons may also be disposed in the notch 10, to increase display modes of the display device.

Displaying images in the display region AA may be performed through a plurality of pixels. The plurality of pixels may include a first plurality of pixels in the first display region A1 and a second plurality of pixels in the second display region A2. In one embodiment, along the row direction, the plurality of data lines D1 and the second display region A2 may be disposed at two opposite sides of the notch 10. The plurality of the data line D1 may only transmit data signals to the first plurality of pixels in the first display region A1 to display images in the first display region A1, but may not transmit data signals to the second plurality of pixels in the second display region A2.

In one embodiment, because of the notch 10, a portion of the plurality of data lines D1 may be disposed to bypass the first edge 11. In other embodiments, the portion of the plurality of data lines D1 which should bypass the first edge 11 may be broken in an area of the notch 10, to form a plurality of sub data lines D01. Data signals may be transmitted to the plurality of sub data lines D01. A configuration of lines may be more flexible.

To illustrate various embodiments of the present disclosure more directly, structures of other film layers are not shown in FIGS. 1-4. The present disclosure has no limit on the structures of the other film layers, and the other films layers may have any suitable structures. Further, the display region AA may have any suitable shape such as a rectangle and a circle. The notch 10 may have any suitable shape, such as a D shape illustrated in FIG. 1, a rectangle, and a semi-circle. In some embodiments, along the row direction, a length of the second display region A2 may be larger than or equal to a length of the first display region A1. In other embodiments, along the row direction, the length of the second display region A2 may be smaller than the length of the first display region A1. The present disclosure has no limit on a relationship between the length of the second display region A2 and the length of the first display region A1 along the row direction.

In the display panel provided by various embodiments of the present disclosure, the first bending axis along the column direction may be disposed in the display region. The display device may have more display modes, and may be easier to be stored and carried. The first edge may be recessed toward the inside of the first display region, to form the notch. Some devices including cameras may be disposed in the notch, to further increase functions of the display device. The plurality of data lines and the second display region may be disposed at two opposite sides of the notch along the row direction. The second display region may be used to realize a full-screen display and to realize a display device with a narrow border.

Figure 5:
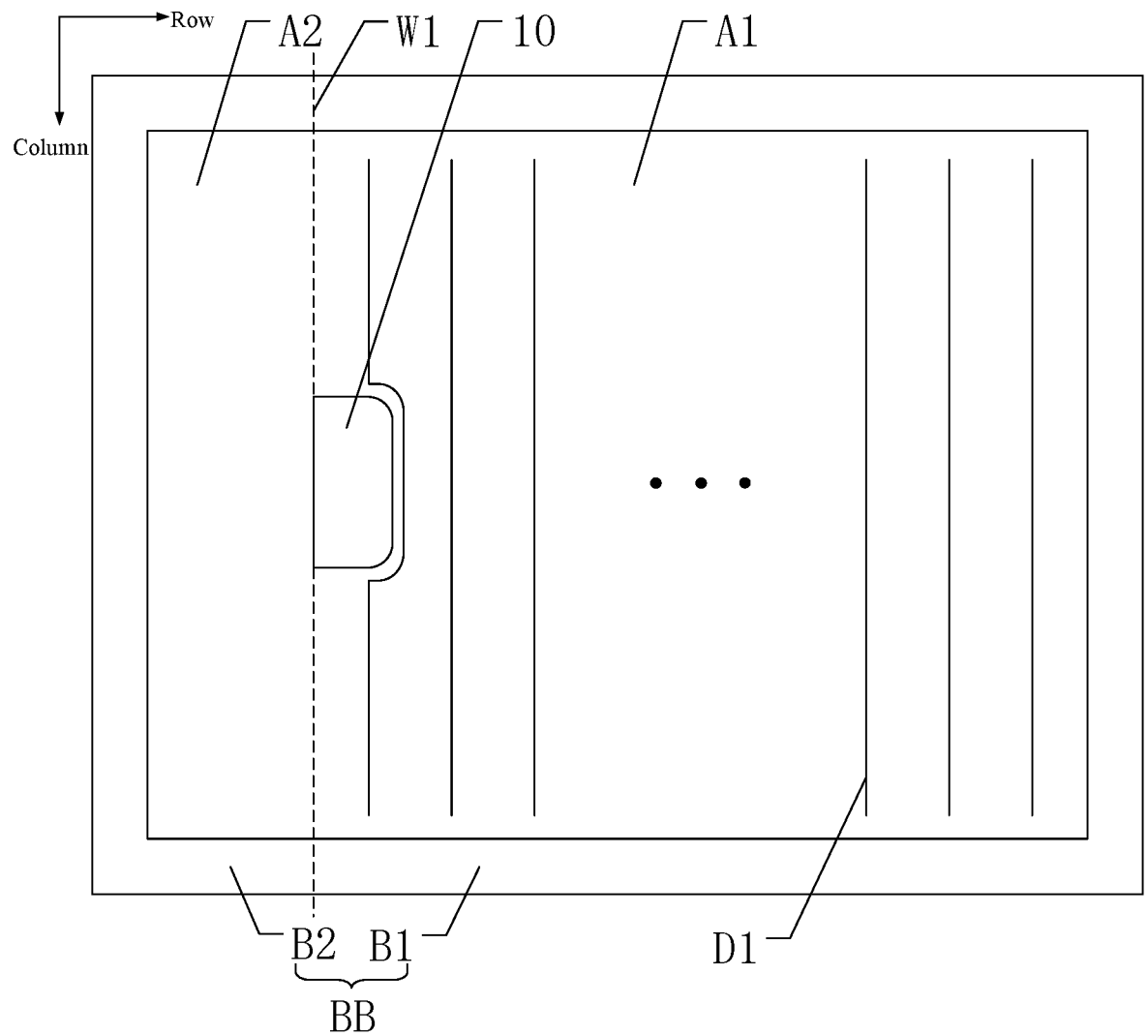
FIG. 5 illustrates another exemplary display panel consistent with various disclosed embodiments in the present disclosure.
Figure 6:
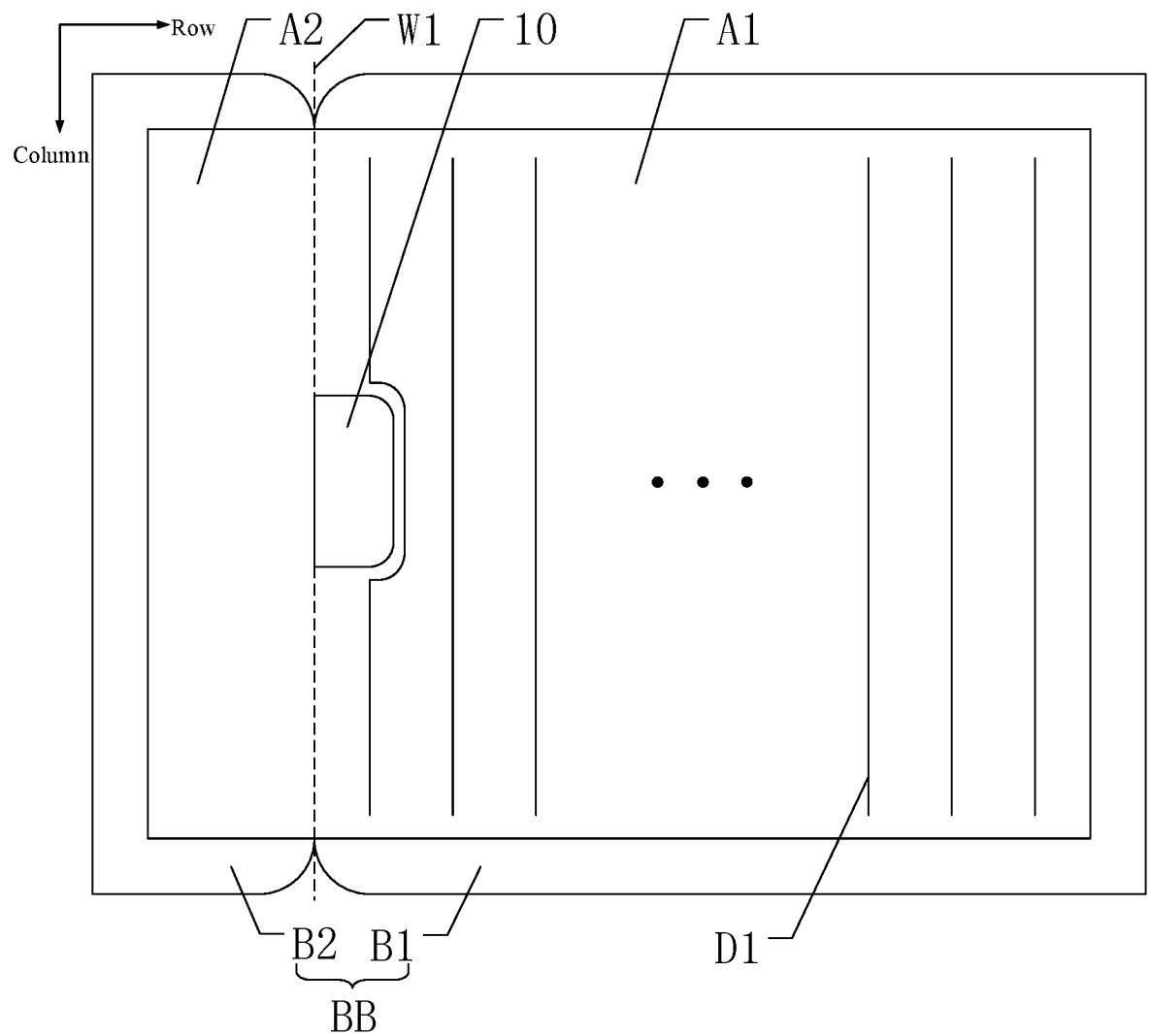
FIG. 6 illustrates a structure of a potential line in an exemplary display panel consistent with various disclosed embodiments in the present disclosure.
Figure 7:
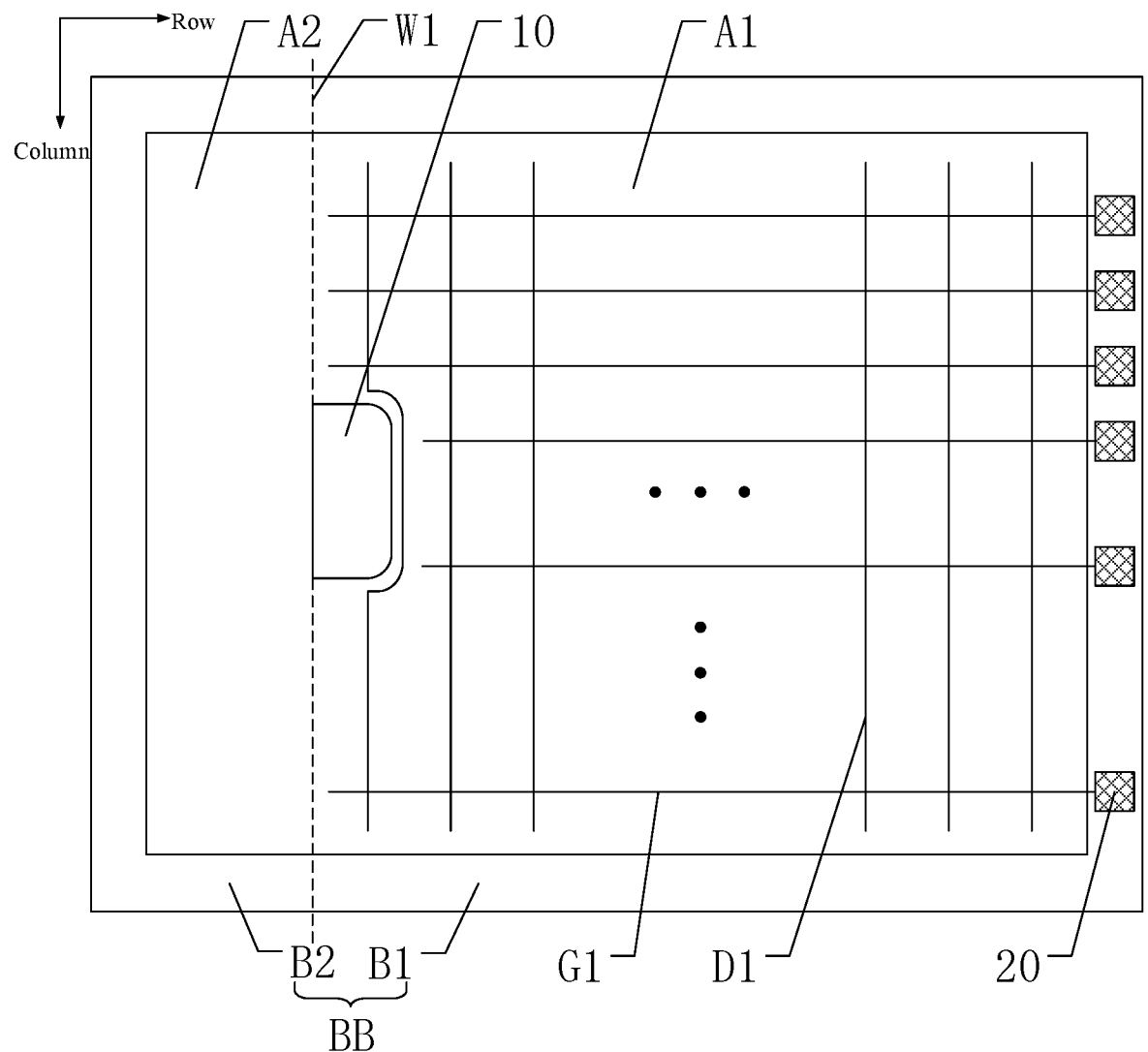
FIG. 7 illustrates another exemplary display panel consistent with various disclosed embodiments in the present disclosure.

In some embodiments, the display panel may further include a non-display region BB, as illustrated in FIGS. 5-6. The non-display region BB may include a first non-display region B1 and a second non-display region B2. The first non-display region B1 may be disposed at a periphery of the first display region A1, and the second non-display region B2 may be disposed at a periphery of the second display region A2.

By disposing the first non-display region B1 at the periphery of the first display region A1 and the second non-display region B2 at the periphery of the second display region A2, a portion of wires in the display panel may be disposed in the first non-display region B1 and the second non-display region B2. The first display region A1 and the second display region A2 may have a good display performance.

For description purposes only, FIG. 5 illustrates the present disclosure by using a display panel where the first non-display region B1 and the second non-display region B2 are connected to each other completely as an example, and FIG. 6 illustrates the present disclosure by using a display panel where the first non-display region B1 and the second non-display region B2 are separated from each other completely as an example. This should not limit the scope of the present disclosure, and the first non-display region B1 and the second non-display region B2 may have any suitable relationship. For example, the first non-display region B1 and the second non-display region B2 may be connected to each other partially in some embodiments.

In one embodiment, the first non-display region B1 may include a plurality of first shift registers 20 in a cascade configuration, and the first display region A1 may include a plurality of first scanning lines G1 extending along the row direction. An output terminal of each of the plurality of first shift registers 20 may be electrically connected to at least one of the plurality of first scanning lines G1.

The plurality of first scanning lines G1 may provide scanning signals to the first plurality of pixels P in the first display region A1 through the plurality of first shift registers 20, and the plurality of first data lines D1 may provide data signals to the first plurality of pixels P in the first display region A1, to realize display images in the first display region A1. For description purposes only, the present disclosure is described by using a display panel where the plurality of first shift registers 20 is disposed at one side of the plurality of first scanning lines G1 away from the notch 10 as an example. The plurality of first shift registers 20 may be disposed any suitable place in the first non-display region B1 according to an actual requirement, and the present disclosure has no limit on the position of the plurality of first shift registers 20 in the first non-display region B1.

Figure 8:
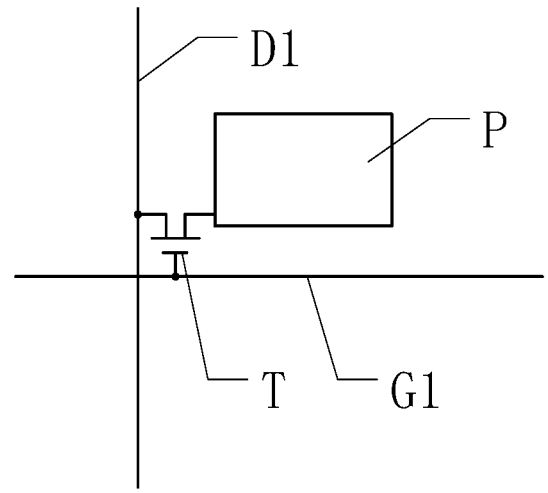
FIG. 8 illustrates an exemplary pixel in an exemplary display panel consistent with various disclosed embodiments in the present disclosure.

In one embodiment, the plurality of first scanning lines G1 extending along the row direction and the plurality of first data lines D1 extending along the column direction may be electrically insulated from each other, to form a plurality of spaces for accommodating the first plurality of pixels P, as illustrated in FIG. 8. The first plurality of pixels P may be electrically connected to the plurality of first scanning lines G1 and the plurality of first data lines D1 through thin film transistors T. Correspondingly, the first plurality of pixels P may have a switch function.

The thin film transistors T may be N-type transistors or P-type transistors, and the present disclosure has no limit on a type of the thin film transistors T. The N-type transistors may be turned on under a control of a high potential signal, and be turned off under a low potential signal. The P-type transistors may be turned on under a control of a low potential signal, and be turned off under a high potential signal.

Figure 9:
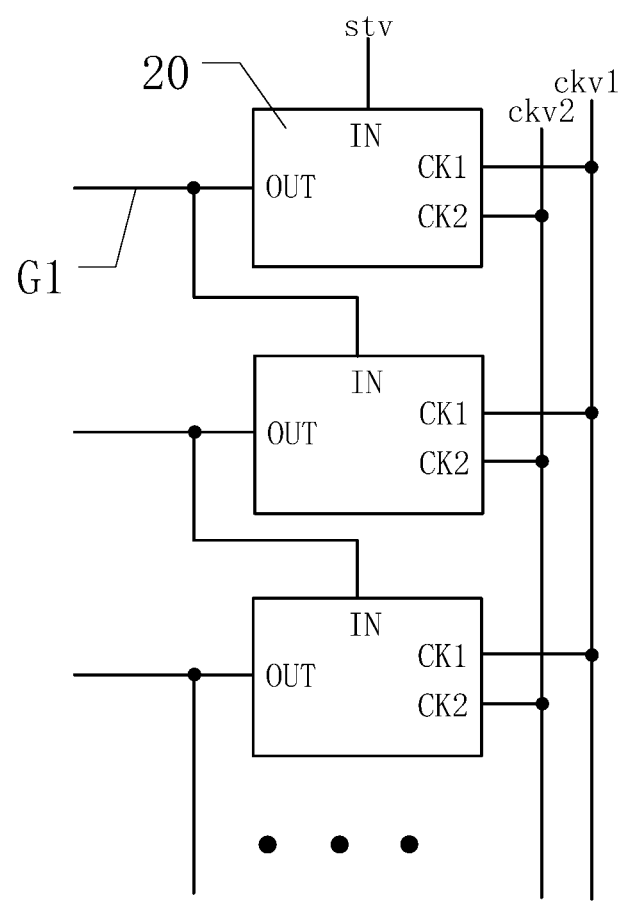
FIG. 9 illustrates an exemplary shift register in an exemplary display panel consistent with various disclosed embodiments in the present disclosure.

The plurality of first shift registers 20 may be configured in a cascade configuration, as illustrated in FIG. 9. Input terminals CK1 and CK2 of each level first shift register 20 of the plurality of first shift registers 20 may receive clock signals ckv1 and ckv2. An input terminal IN of a first-level shift register 20 of the plurality of first shift registers 20 may receive initial signals sty. Starting at a second-level shift register 20 of the plurality of first shift registers 20, an input terminal IN of each level first shift register 20 of the plurality of first shift registers 20 may be electrically connected to an output terminal OUT of previous-level shift register 20 of the plurality of first shift registers 20, to provide scanning signals to the plurality of scanning lines G1 one level by one level. The scanning signals may be any suitable scanning signals including positive scanning signals or negative scanning signals, and the present disclosure has no limit on a type of the scanning signals.

Figure 10:
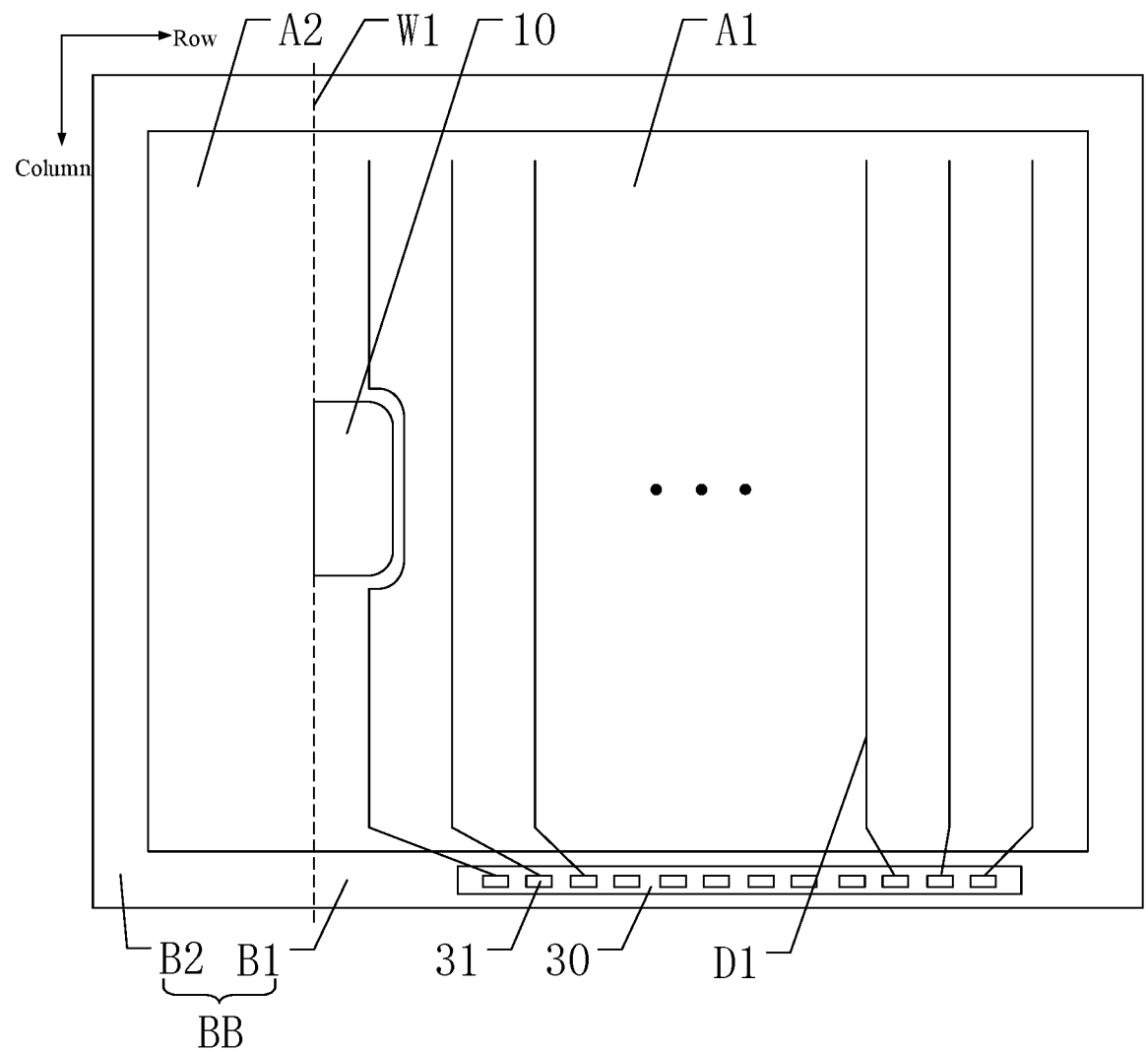
FIG. 10 illustrates another exemplary display panel consistent with various disclosed embodiments in the present disclosure.

In some embodiments, as illustrated in FIG. 10, the first non-display region B1 may further include a first bonding region 30. The first bonding region 30 may include a plurality of first conductive soldering pads 31. The plurality of first data lines D1 may be electrically connected to the plurality of first conductive soldering pads 31. The data signals may be transmitted to the plurality of first data lines D1 through driving chips in the first bonding region 30.

For description purposes only, FIG. 10 illustrates a display panel where the first bonding region 30 is disposed at a specific position in the first non-display region B1 as an example only and the present disclosure has no limit on the position of the first bonding region 30 in the first non-display region B1. In various embodiments, the first bonding region 30 may be disposed at any suitable position in the first non-display region B1

Figure 12:
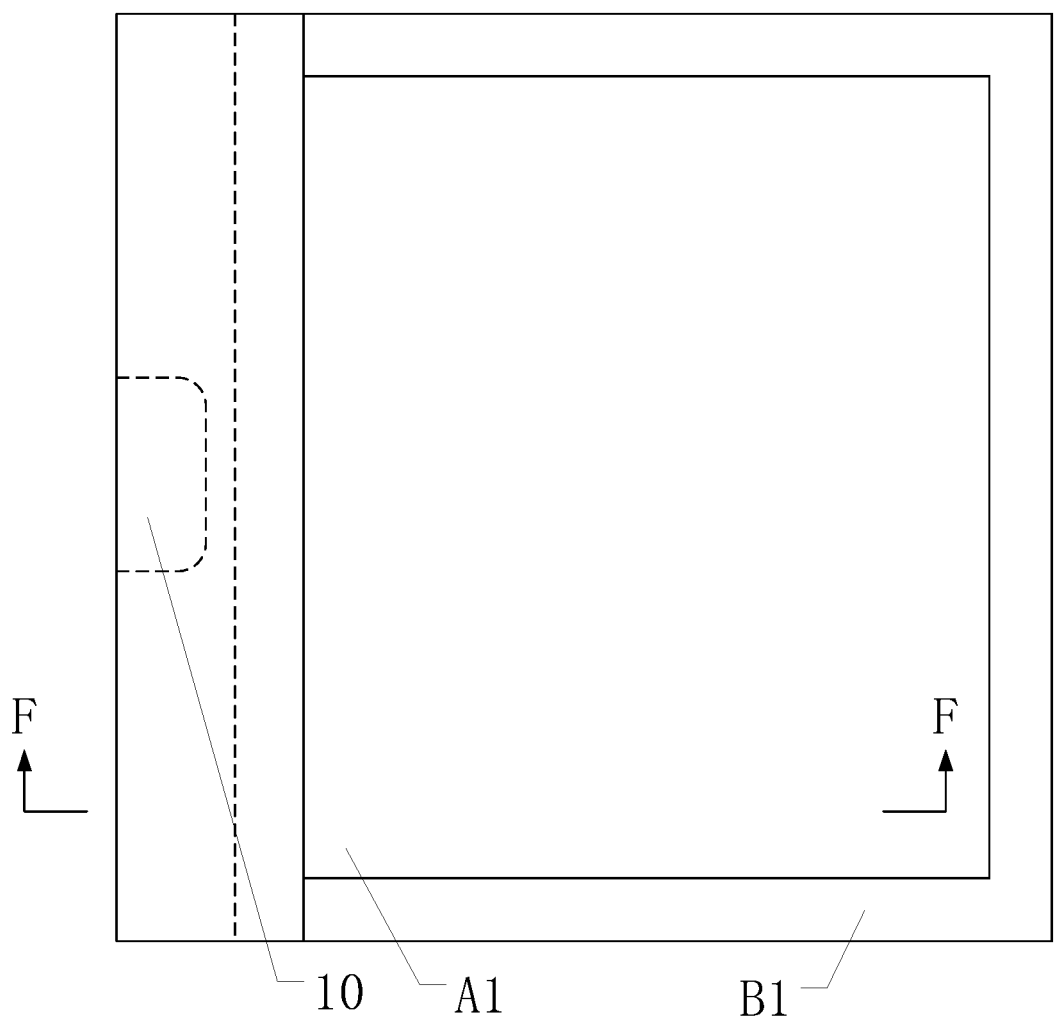
FIG. 12 illustrates a planar structure of the display panel in FIG. 11 consistent with various disclosed embodiments in the present disclosure after the display panel is bent.

In some embodiments, as illustrated in FIG. 12, the second non-display region B2 may include a first sub-region b1 and two second sub-regions b2. The first sub-region b1 may be adjacent to the second display region A2 along the row direction. Two second sub-regions b2 may be disposed on two opposite sides of the second display region A2 along the column direction.

In one embodiment, the display region AA may be divided into the first display region A1 and the second display region A2 by the first bending axis W1. Then the first display region A1 and the second display region A2 may be adjacent to each other in a region besides the notch 10. Since the first sub-region b1 may be adjacent to the second display region A2 along the row direction, the first sub-region b1 and the first display region A1 may be disposed on two opposite sides of the second display region A2 along the row direction. Two second sub-regions b2 may be disposed on two opposite sides of the second display region A2 along the column direction. Correspondingly, the second display region A2 may be surrounded by the first sub-region b1, two second sub-region b2, and the first display region A1. Wires in the display panel may be configured more conveniently.

In one embodiment, the display panel may further include a second bending axis W2 disposed between the first sub-region b1 and the second display region A2. The second bending axis W2 may extend along the column direction.

Figure 13:
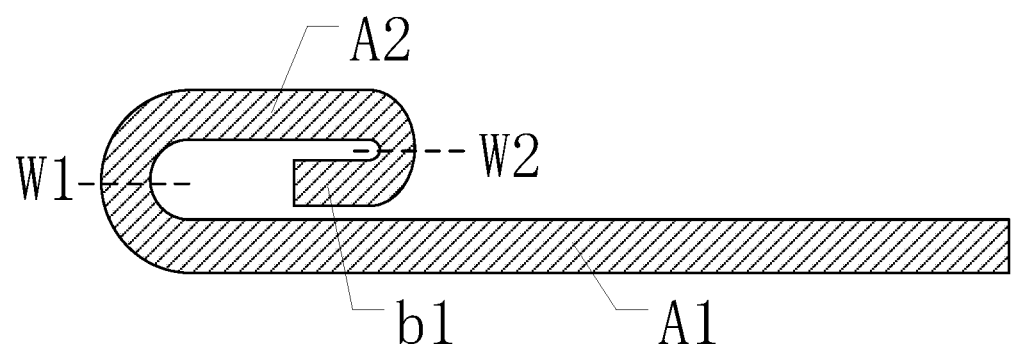
FIG. 13 illustrates a cross-section view of the display panel in FIG. 12 consistent with various disclosed embodiments in the present disclosure, along the F-F direction.

The second bending axis W2 may be disposed at a boundary between the first sub-region b1 and the second display region A2. As illustrated in FIGS. 12-13, the first sub-region b1 may be bent toward a direction close to a front of the second display region A2. For description purposes only, the present disclosure is described by using an embodiment where the first sub-region b1 is bent toward the direction close to the front of the second display region A2 as an example. In various embodiments, the first sub-region b1 may be bent toward any suitable direction and the present disclosure has no limit on this. For example, in one embodiment, the first sub-region b1 may be bent toward a direction close to a back of the second display region A2. Correspondingly, the display panel may be bent twice through the first bending axis W1 and the second bending axis W2. The display panel may be stored and/or carried more conveniently.

Figure 14:
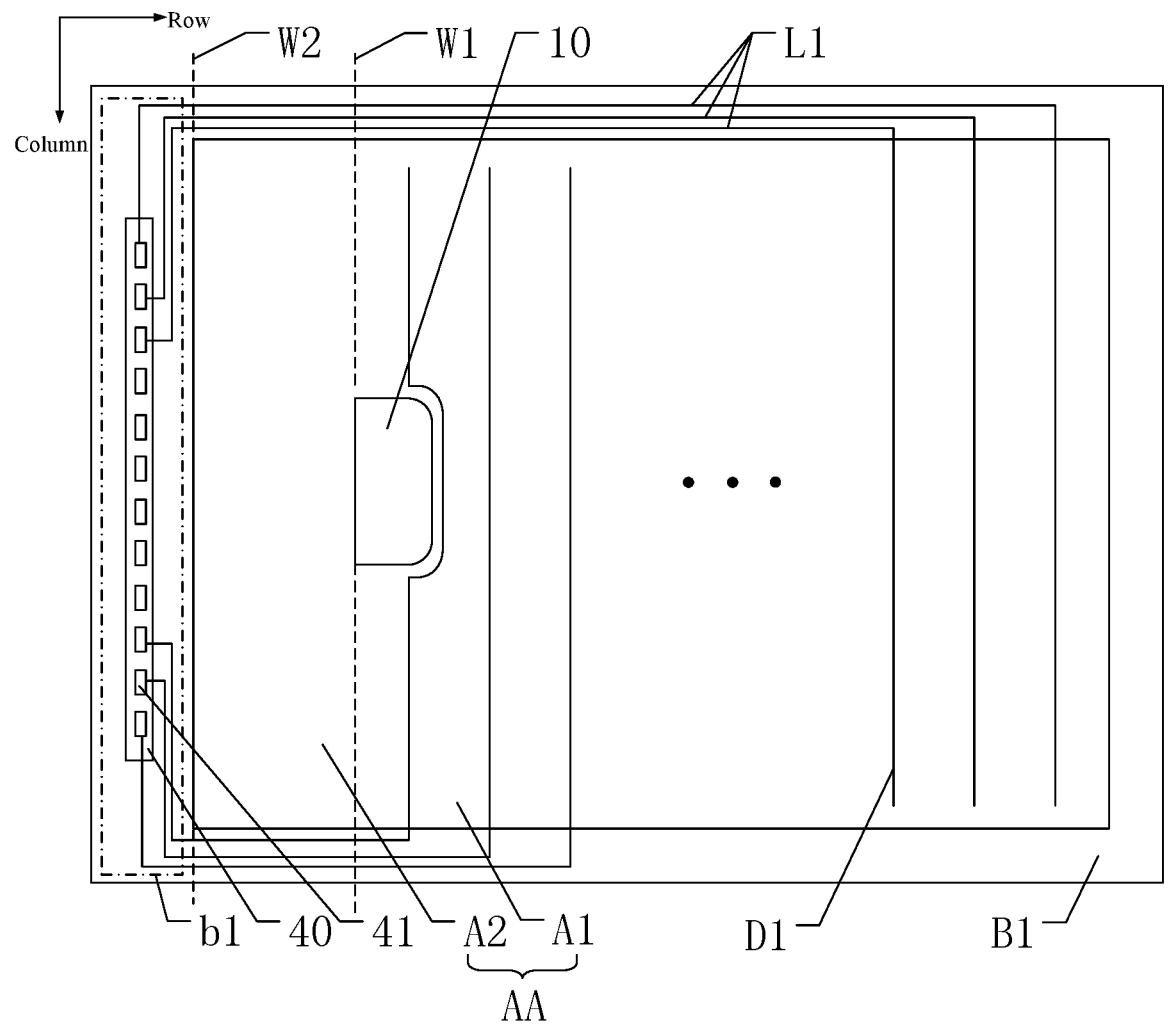
FIG. 14 illustrates another exemplary display panel consistent with various disclosed embodiments in the present disclosure.

In one embodiment, the first sub-region b1 may include a second bonding region 40, and the second bonding region 40 may include a plurality of second conductive soldering pads 41, as illustrated in FIG. 14. The non-display region BB may further include a plurality of first connection lines L1. One end of each of the plurality of first connection lines L1 may be electrically connected to one of the plurality of first data lines D1, and another end of each of the plurality of first connection lines L1 may be electrically connected to one of the plurality of second conductive soldering pads 41.

In one embodiment, when the second bonding region 40 is disposed in the first sub-region b 1, the second sub-region b2 may have a larger width along the row direction, to arrange wires more conveniently. Correspondingly, since the first sub-region b1 can be bent along the second bending axis W2, one side of the second display region A2 close to the first sub-region b1 may be close to a display region without a border, as illustrated in FIGS. 12-13. A visual effect of the display panel may be improved.

The plurality of first data lines D1 may be electrically connected to the plurality of second conductive soldering pads 41 through the plurality of first connection lines L1. In various embodiments, the plurality of first connection lines L1 may be configured in any suitable configuration, and the present disclosure has no limit on the configuration of the plurality of first connection lines L1. For example, in one embodiment illustrated in FIG. 14, the plurality of first connection lines L1 may include a first plurality of first connection lines L1 and a second plurality of first connection lines L1. The first plurality of first connection lines L1 and the second plurality of first connection lines L1 may be disposed at two opposite sides of the first display region A1 respectively. Correspondingly, a load difference between each of the plurality of first connection lines L1 may be small and the display performance of the first display region A1 may be improved.

In some embodiments, the second display region A2 may include a plurality of second data lines D2. The plurality of second data lines D2 may extend along the row direction or along the column direction. The second non-display region A2 may include a plurality of second connection lines L2. For each of the plurality of second connection lines L2, one end may be electrically connected to one of the plurality of second data lines D2, and another end may be electrically connected to one of the plurality of second conductive soldering pads 41.

In various embodiments, the plurality of second data lines D2 may extend along the row direction or along the column direction, to meet different display requirements. For description purposes only, the present disclosure is described by using a display panel where the plurality of second data lines D2 extends along the column direction as an example. The plurality of second connection lines L2 may include a first plurality of second connections lines L2 and a second plurality of second connections lines L2. The first plurality of second connections lines L2 and the second plurality of second connections lines L2 may be wound into the first sub-region b1 from two opposite sides of the second display region A2 along the column direction, to be connected to the plurality of second conductive soldering pads 41. A load difference between each of the plurality of second connection lines L2 may be reduced and a display performance of the second display region A2 may be improved.

Figure 15:
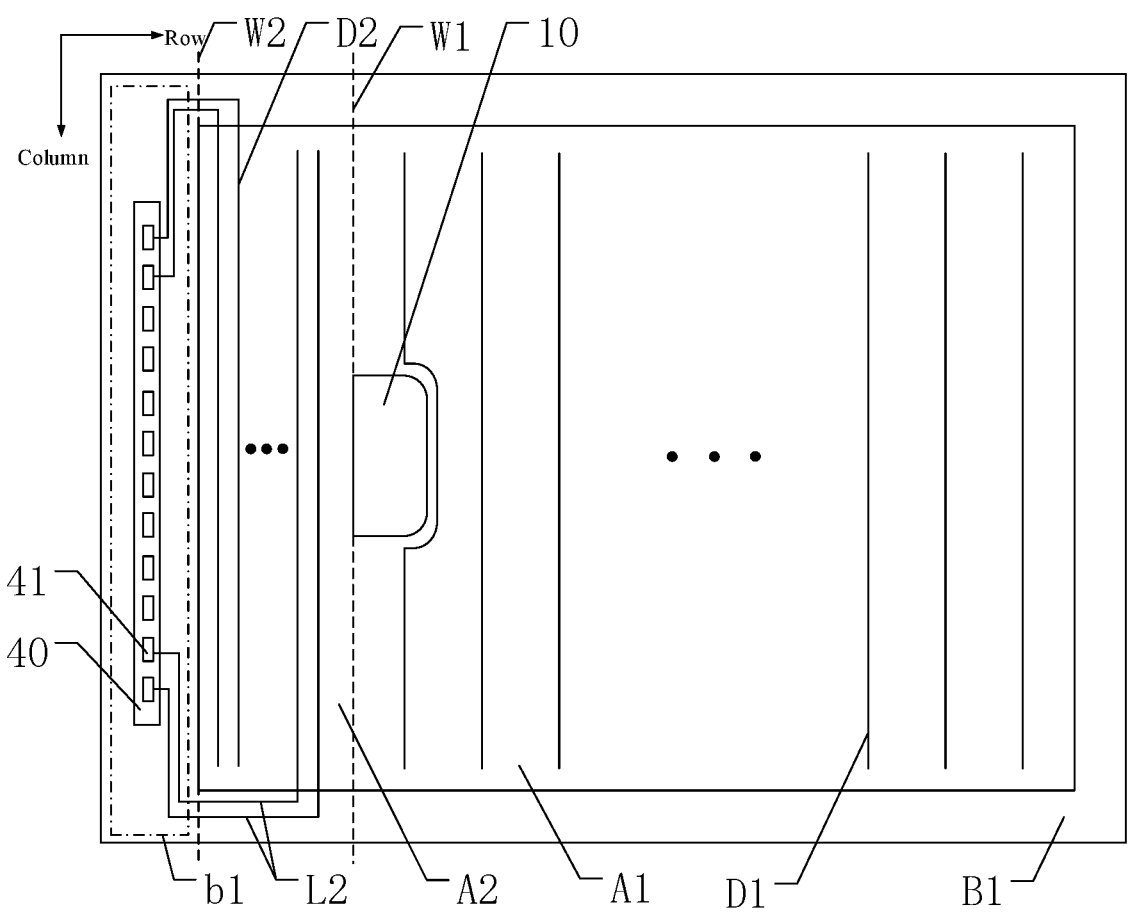
FIG. 15 illustrates a circuit connecting pixel capacitances to thin film transistors in an exemplary display panel consistent with various disclosed embodiments in the present disclosure.

For description purposes only, the present disclosure is explained by using a display panel where the plurality of second connection lines L2 is configured in a specific configuration illustrated in FIG. 15 as an example. The present disclosure has no limit on a configuration of the plurality of second connection lines L2, and the plurality of second connection lines L2 can be configured in any suitable configuration.

Figure 16:
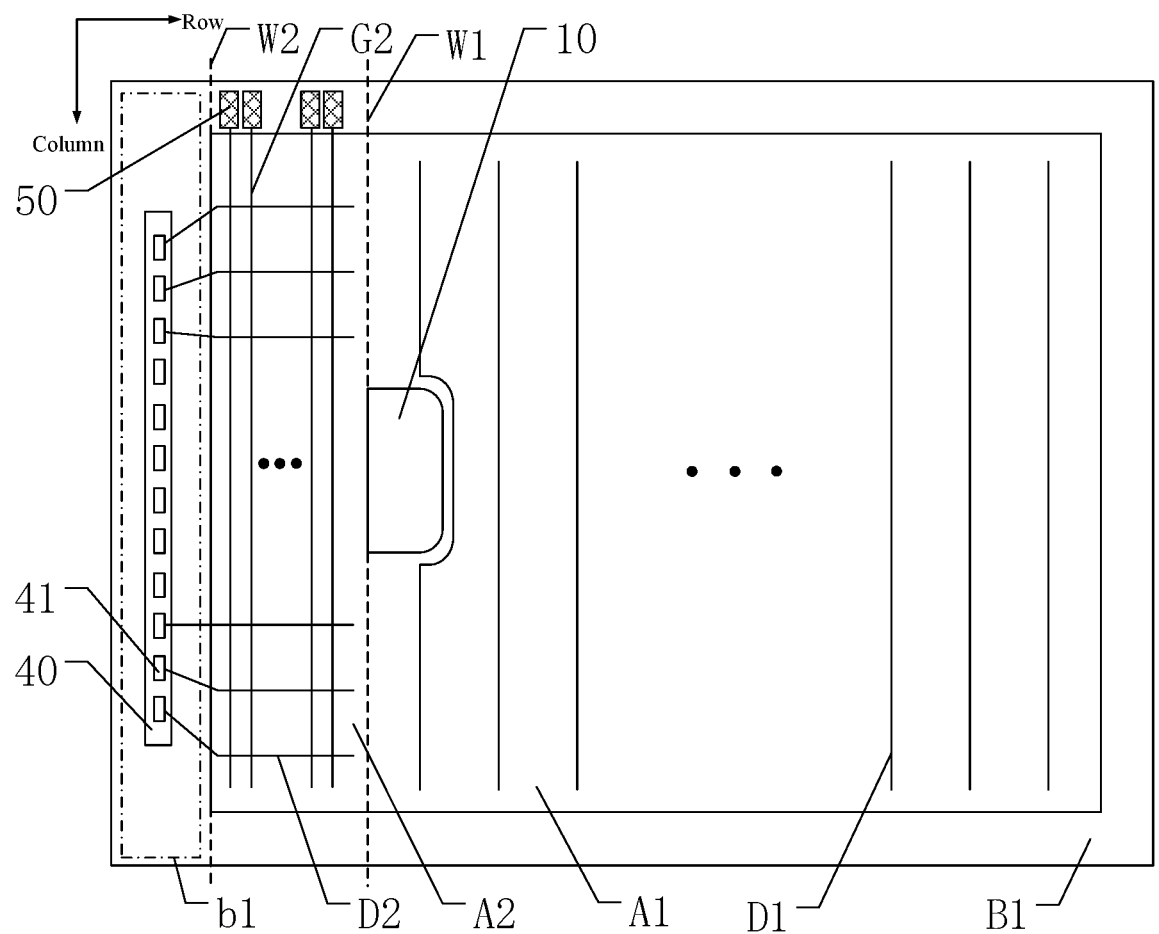
FIG. 16 illustrates another exemplary display panel consistent with various disclosed embodiments in the present disclosure.

In one embodiment, as illustrated in FIG. 16, the second display region A2 may further include a plurality of second scanning lines G2. An extending direction of the plurality of second scanning lines G2 may cross an extending direction of the plurality of second data lines D2. The second non-display region B2 may further include a plurality of second shift registers 50 in a cascade configuration. An output terminal of each of the plurality of second shift registers 50 may be electrically connected to at least one of the plurality of second scanning lines G2.

In various embodiments of the present disclosure, the plurality of second scanning lines G2 may extend along the row direction or along the column direction, as long as the extending direction of the plurality of second scanning lines G2 can cross the extending direction of the plurality of second data lines D2. The present disclosure will be described by using a display panel in FIG. 16 where the plurality of second data lines extends along the row direction and the plurality of second scanning lines along the column direction as an example only, and has no limit on an arrangement of the plurality of second scanning lines G2. As illustrated in FIG. 16, the plurality of second data lines D2 may extend along the row direction and the plurality of second scanning lines G2 may extend along the column direction. Correspondingly, wires used to connect the plurality of second data lines D2 to the plurality of second conductive soldering pads 41 may be simpler. Further, the plurality of second shift registers 50 may be disposed in the second non-display region B2 avoiding the second bonding region 40. The arrangement of wires in the display panel may be more effective. In various embodiments of the present disclosure, the plurality of second shift registers 50 may be disposed at any suitable position in the second non-display region B2, and the present disclosure has no limit on the position of the plurality of second shift registers 50.

The plurality of second shift registers 50 may be configured in a cascade configuration similar to the cascade configuration of the plurality of first shift registers 20 illustrated in FIG. 9.

Figure 17:
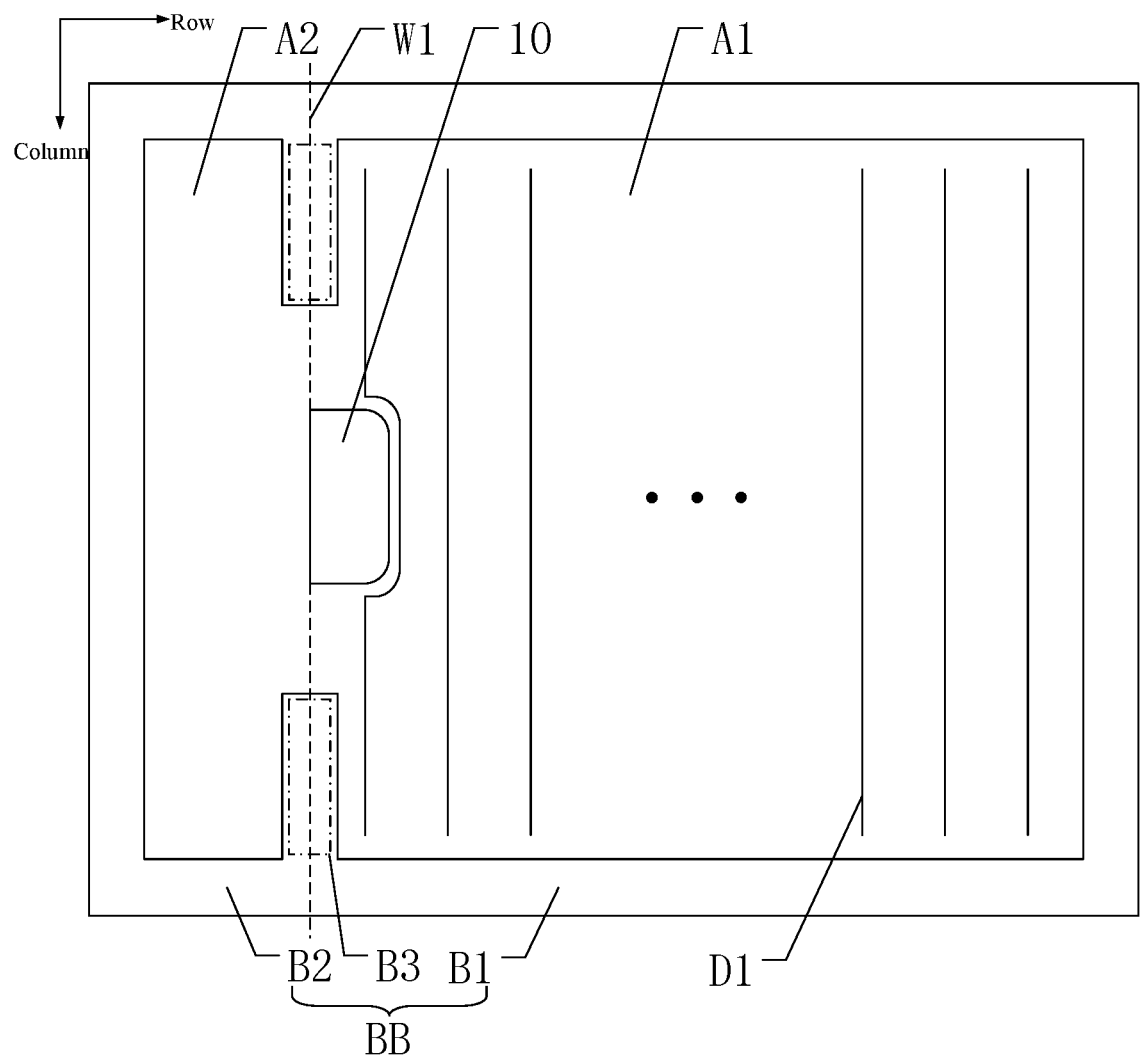
FIG. 17 illustrates another exemplary display panel consistent with various disclosed embodiments in the present disclosure.

In one embodiment, as illustrated in FIG. 17, the non-display region BB may further include a third non-display region B3 between the first display region A1 and the second display region A2.

Although the third non-display region B3 between the first display region A1 and the second display region A2 may reduce a screen ratio of the display panel, an arrangement of wires/lines in the display panel may be more flexible by introducing the third non-display region B3.

For description purposes only, the present disclosure is explained by using a display panel in FIG. 17 where the non-display region BB may further include a third non-display region B3 between the first display region A1 and the second display region A2 as an example. The present disclosure has no limit on an arrangement of the third non-display region B3. For example, in one embodiment, the third non-display region B3 may be not disposed in the display panel to improve the screen ratio to meet the actual requirements. In some other embodiments, one or more third non-display regions B3 may be disposed between the first display region A1 and the second display region A2.

In one embodiment, as illustrated in FIG. 17, the third non-display region B3 may be connected to the first non-display region B1 and the second non-display region B2. The wiring in the display panel may be more flexible.

Figure 18:
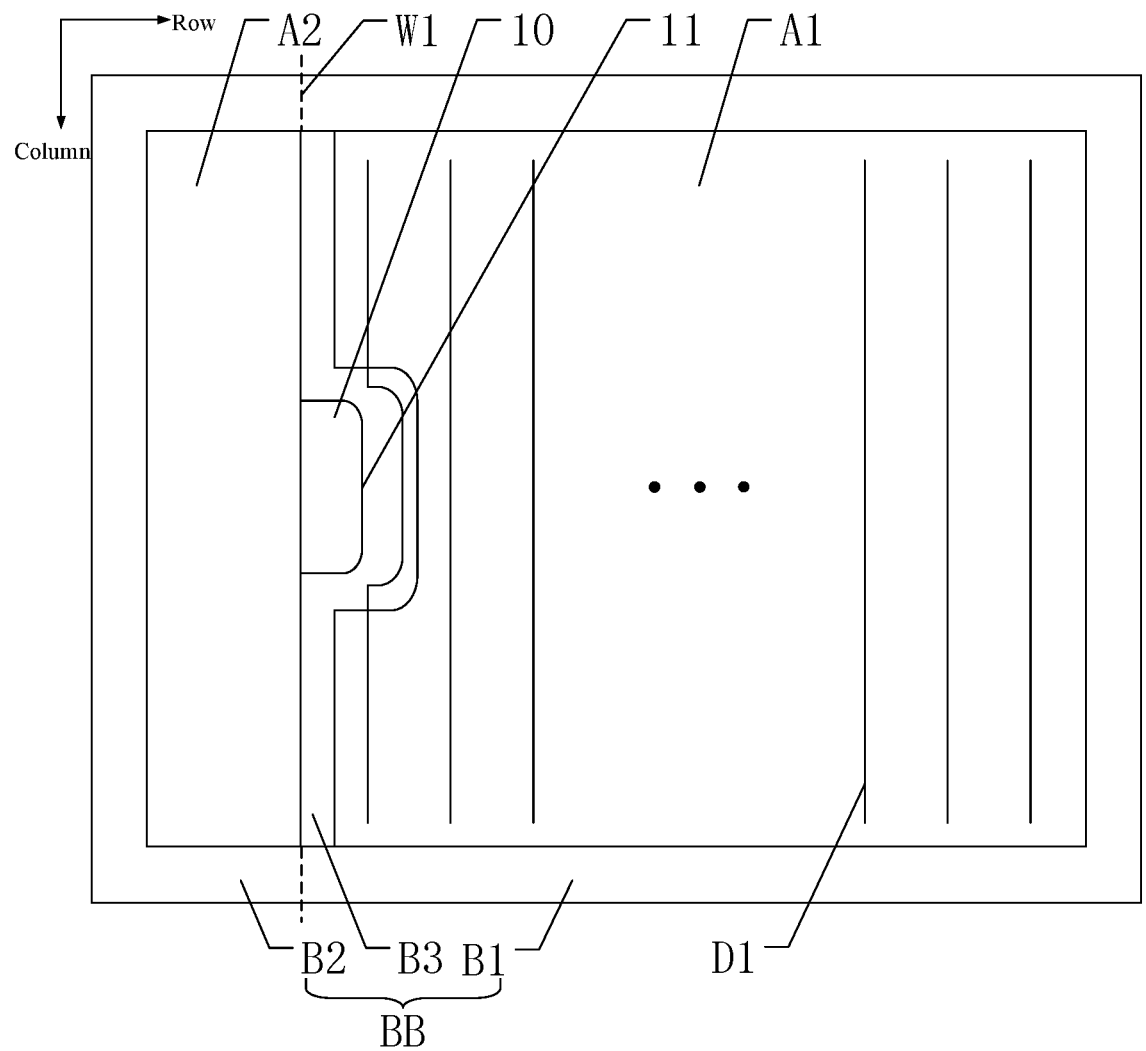
FIG. 18 illustrates another exemplary display panel consistent with various disclosed embodiments in the present disclosure.

In one embodiment, as illustrated in FIG. 18, along the column direction, the third non-display region B3 may be adjacent to the first edge 11. Then at least a portion of the third non-display region B3 may be disposed between the notch 10 and the first display region A1. Correspondingly, a portion of the plurality of first data lines D1 which has to bypass the notch 10 originally may pass the third non-display region B3 directly. An influence of the wiring on a display uniformity of the first display region A1 may be reduced.

Figure 19:
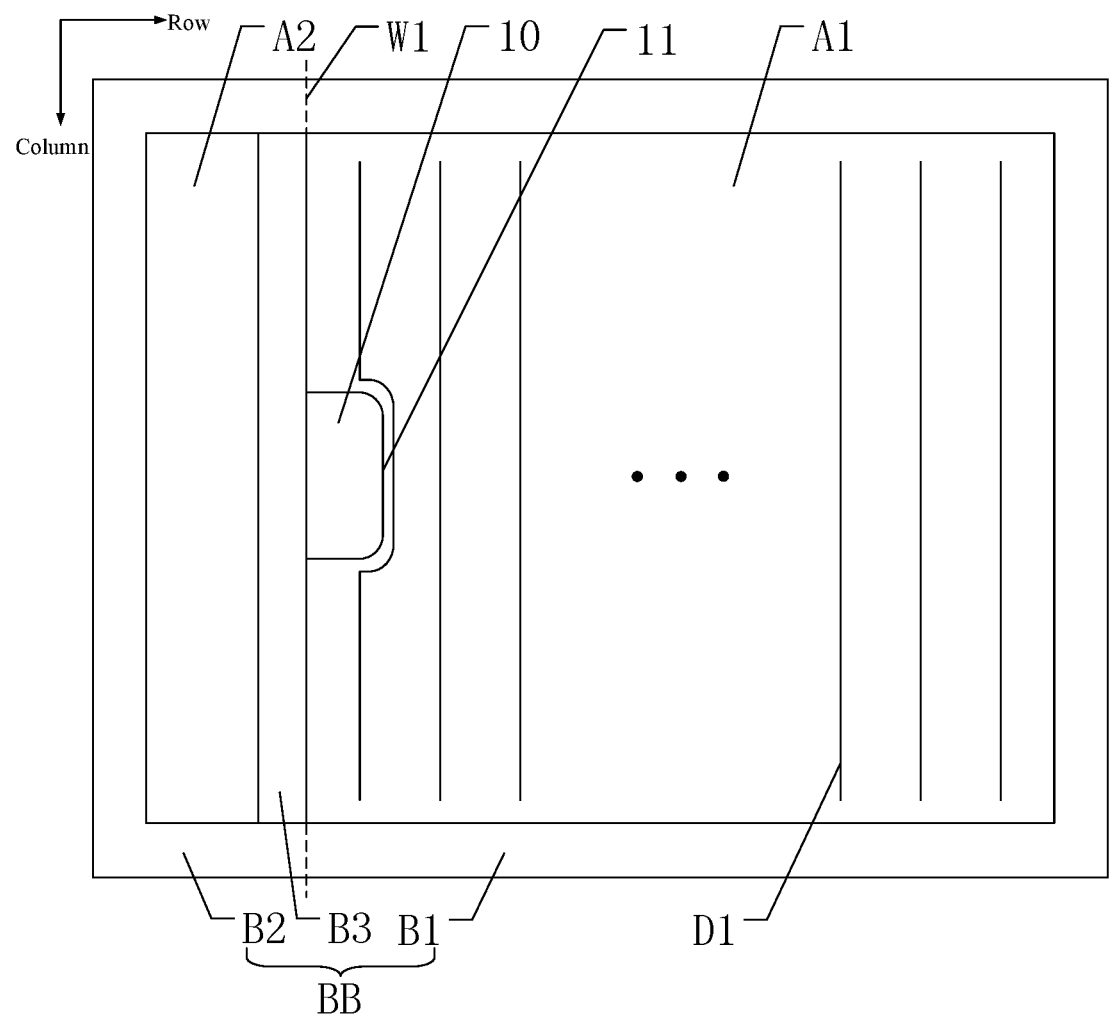
FIG. 19 illustrates another exemplary display panel consistent with various disclosed embodiments in the present disclosure.

In one embodiment, as illustrated in FIG. 19, along the column direction, the third non-display region B3 and the first edge 11 may be disposed on two opposite sides of the notch 10. Correspondingly, at least a portion of the third non-display region B3 may be adjacent to the notch 10 along the column direction. A portion of lines in the display panel may be disposed in the third non-display region, and the wiring in the display panel may be more flexible.

In some embodiments, the third non-display region B3 in FIGS. 18-19 may be connected to the first non-display region B1, or be separated from the first non-display region B1, according to the actual display requirements.

Figure 20:
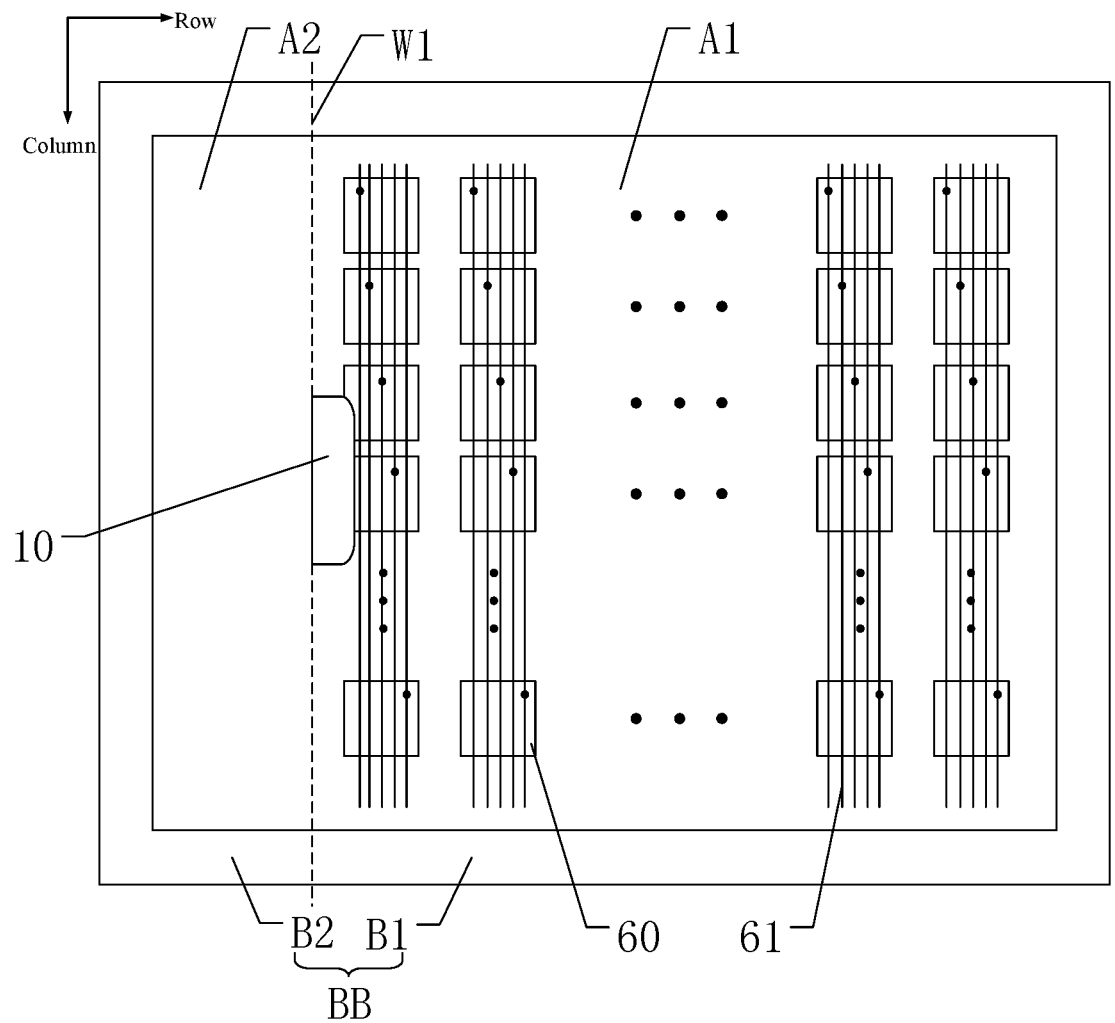
FIG. 20 illustrates another exemplary display panel consistent with various disclosed embodiments in the present disclosure.

In some embodiments, as illustrated in FIG. 20, the first display region A1 may further include a plurality of first touching electrodes 60 and a plurality of first touching wires 61. Each of the plurality of first touching electrodes 60 may be connected to at least one of the plurality of first touching wires 61, and may be electrically insulated from other of the plurality of first touching wires 61.

In one embodiment, the plurality of first touching electrodes 60 may be used to sense users' touching operations in the first display region A1, for example, to sense position information of the touching operations. This information may be transmitted to driving chips through the plurality of first touching wires 61, to perform corresponding signal feedback operations.

The present disclosure has no limit on a work mode of the plurality of first touching electrodes 60 and on an extending direction of the plurality of first touching wires 61. In various embodiments of the present disclosure, the plurality of first touching electrodes 60 may adopt any suitable work mode and on the plurality of first touching wires 61 may extend in any suitable direction. For example, the work mode of the plurality of first touching electrodes 60 may be a self-capacitive mode or a mutual capacitive mode, and the plurality of first touching wires 61 may extend along the column direction illustrated in FIG. 20.

Figure 21:
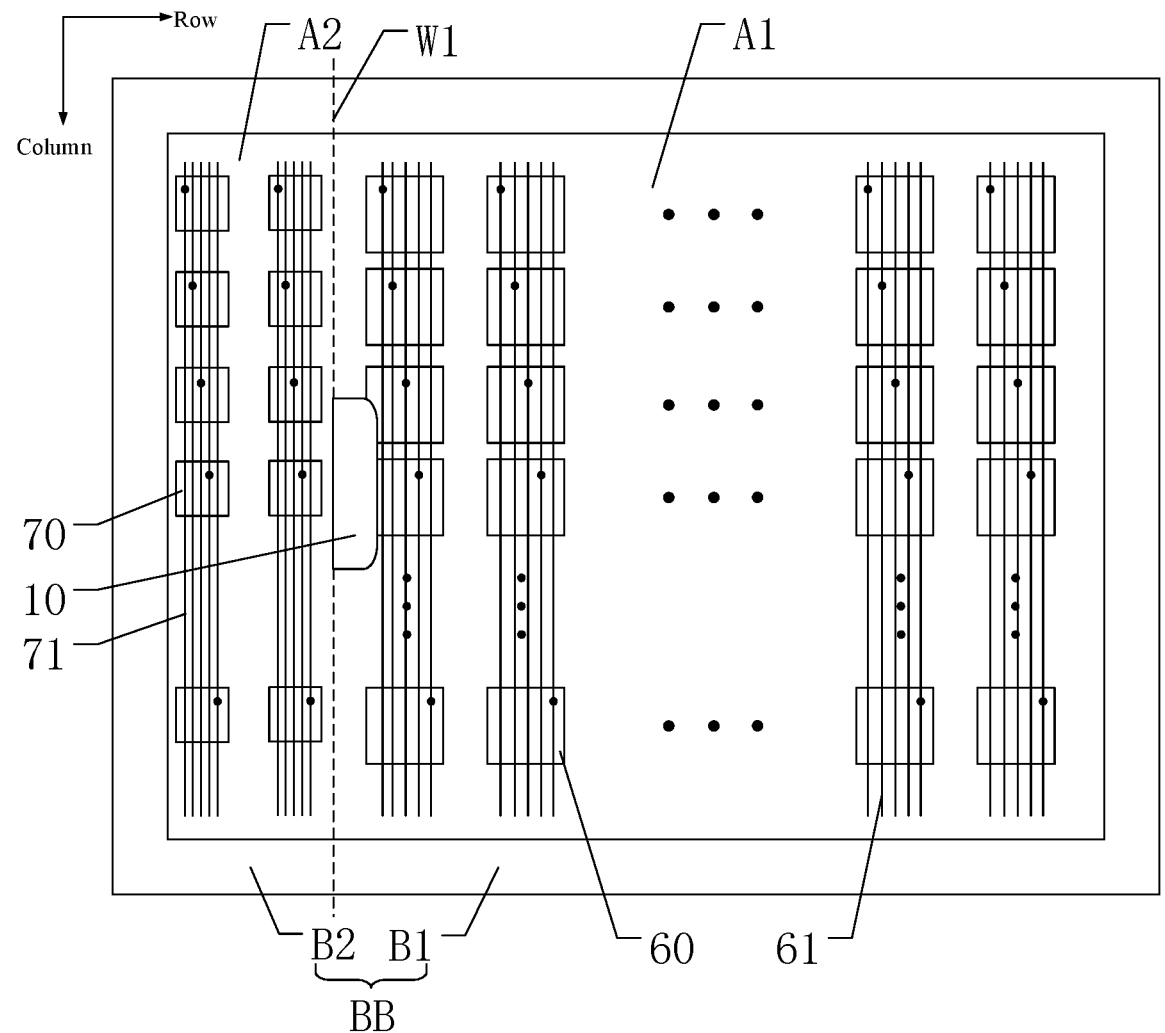
FIG. 21 illustrates another exemplary display panel consistent with various disclosed embodiments in the present disclosure.

In some embodiments, as illustrated in FIG. 21, the second display region A2 may further include a plurality of second touching electrodes 70 and a plurality of second touching wires 71. Each of the plurality of second touching electrodes 70 may be connected to at least one of the plurality of second touching wires 71, and may be electrically insulated from other of the plurality of second touching wires 71.

In one embodiment, the plurality of second touching electrodes 70 may be used to sense users' touching operations in the second display region A2, for example, to sense position information of the touching operations. This information may be transmitted to driving chips through the plurality of second touching wires 71, to perform corresponding signal feedback operations.

The present disclosure has no limit on a work mode of the plurality of second touching electrodes 70 and on an extending direction of the plurality of second touching wires 71. In various embodiments of the present disclosure, the plurality of second touching electrodes 70 may adopt any suitable work mode and on the plurality of second touching wires 71 may extend in any suitable direction. For example, the work mode of the plurality of second touching electrodes 70 may be a self-capacitive mode or a mutual capacitive mode, and the plurality of second touching wires 71 may extend along the column direction illustrated in FIG. 21.

For description purposes only, the present disclosure is explained by using a display panel where both the plurality of first touching electrodes 60 and the plurality of second touching electrodes 70 are disposed as an example, and has no limit on a configuration of the plurality of first touching electrodes 60 and the plurality of second touching electrodes 70. For example, one or both of the plurality of first touching electrodes 60 and the plurality of second touching electrodes 70 may be disposed in the display panel according to different actual display requirements.

Figure 22:
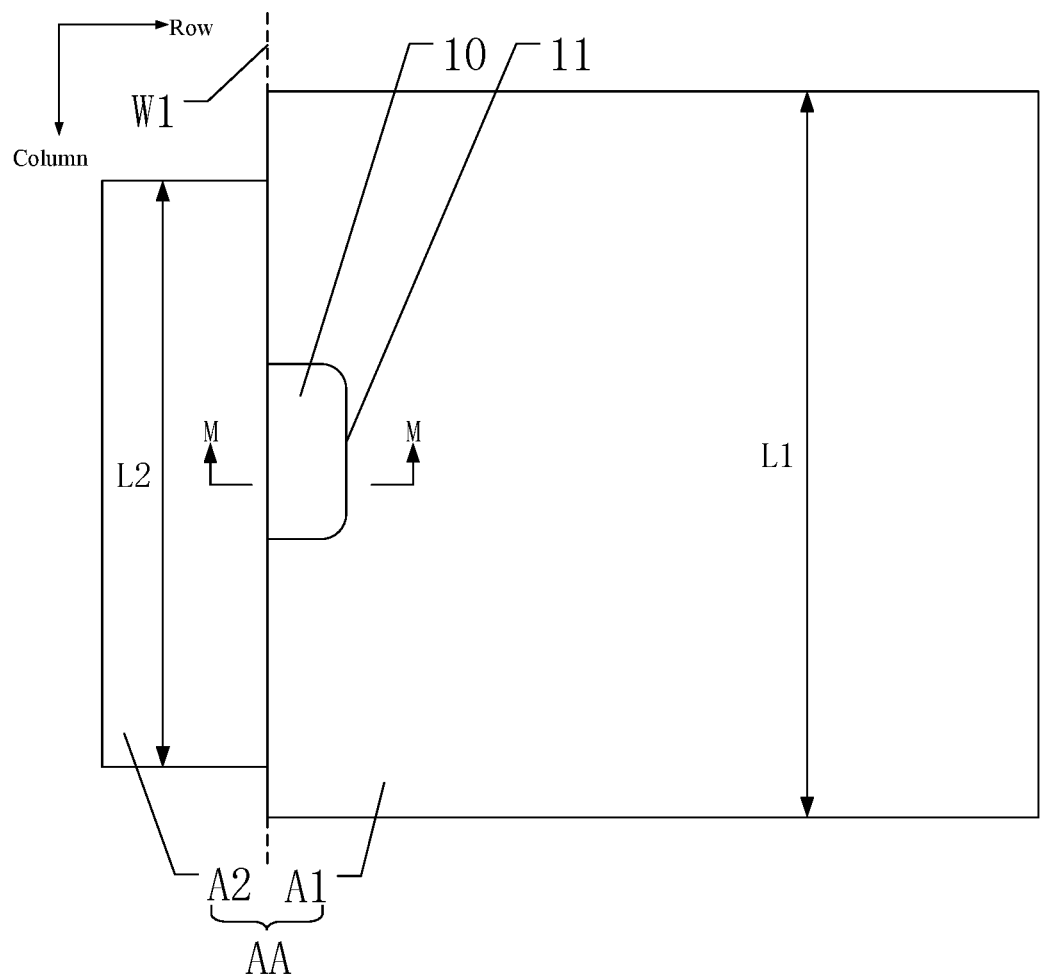
FIG. 22 illustrates another exemplary display panel consistent with various disclosed embodiments in the present disclosure.

In some embodiments, as illustrated in FIG. 22, along the column direction, the first display region A1 has a length L1 and the second display region A2 has a length L2. L2 may be smaller than or equal to L1. To illustrate the various embodiments of the present disclosure more directly, other structures in the display panel are not shown in FIG. 22.

In various embodiments of the present disclosure, along the column direction, the length of the second display region A2 may be smaller than the length of the first display region A1, then a contact area between the first display region A1 and the second display region A2 may be reduced. Correspondingly, the display region AA may be bent along the first bending axis W1 by a smaller bending force. The display region AA may be bent more easily.

Figure 23:
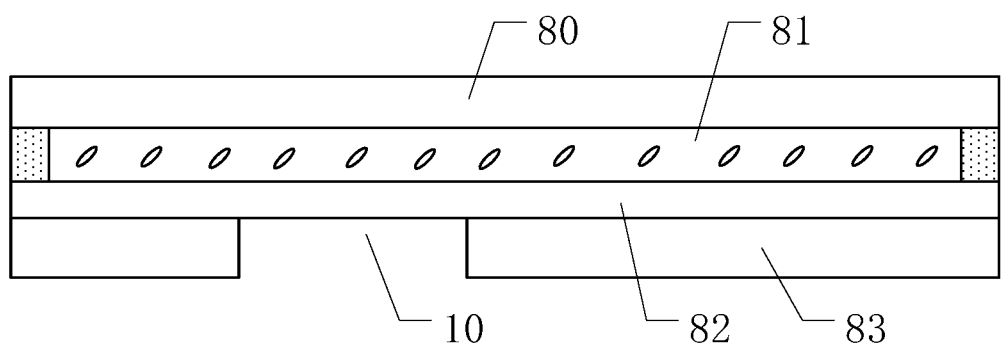
FIG. 23 illustrates a cross-section view of a display panel in FIG. 22 consistent with various disclosed embodiments in the present disclosure, along the M-M direction.

In some embodiments, as illustrated in FIGS. 22-23, the notch may penetrate at least a portion of film layers of the display panel along a direction perpendicular to the display panel.

For description purposes only, the present disclosure will be explained by using a display panel with a structure of film layers illustrated in FIG. 23 as an example only in below, and has no limit on the structure of film layers in the display panel. In various embodiments, the display panel may have any suitable structure of the film layers. In one embodiment, as illustrated in FIG. 23, the structure of the film layers in the display panel may include sequentially: a color film panel 80, a liquid crystal layer, an array panel 82, and a backlight module 83. The notch 10 may only penetrate the backlight module 83, and film layers in the color panel 80 and in the array panel 82 with a low light transmission rate. Then lights can transmit through the notch 10. This is for description purposes only, and the present disclosure has no limit on a configuration of the notch and film layers.

In some embodiments, the color film panel 80, the array panel 82 and the backlight module 83 may be made of flexible materials, so the display panel shown in FIG. 23 may be bent easily.

Figure 24:
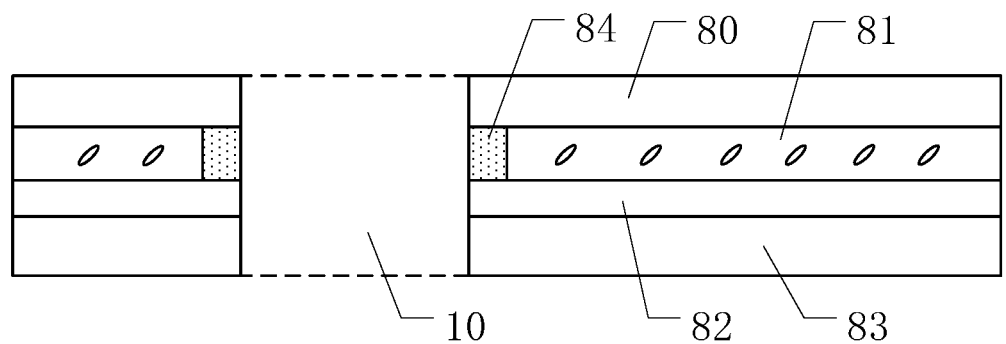
FIG. 24 illustrates another cross-section view of a display panel in FIG. 22 consistent with various disclosed embodiments in the present disclosure, along the M-M direction.

In one embodiment, as illustrated in FIG. 22 and FIG. 24, the notch 10 may penetrate the display panel along the direction perpendicular to the display panel. Further, a portion of the structure of the film layers in a region of the display panel where the notch 10 is disposed may be removed based on the structure illustrated in FIG. 23. Correspondingly, the notch 10 may be completely hollow. Frame adhesives 84 may be disposed in the liquid crystal layer 81 close to the notch 10, to prevent a leakage of liquid crystals in the liquid crystal layer 81.

Figure 25:
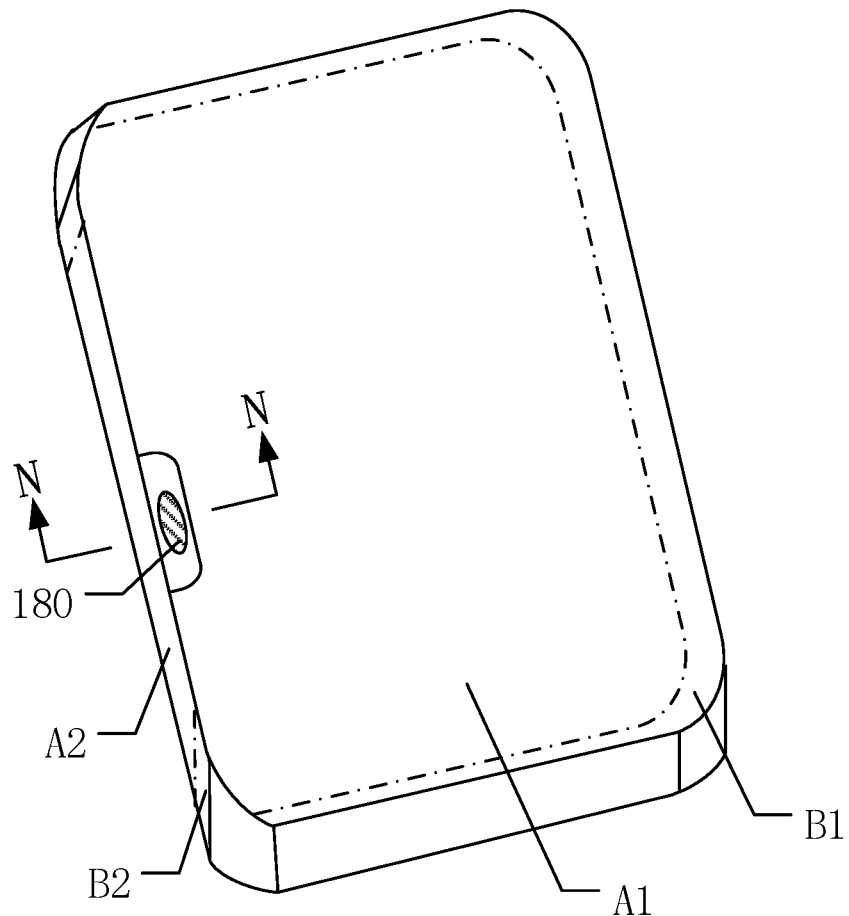
FIG. 25 illustrates an exemplary display device consistent with various disclosed embodiments in the present disclosure.

The present disclosure also provides a display device. FIG. 25 illustrates a display device consistent with various embodiments of the present disclosure. For description purposes only, FIG. 25 illustrates a display device consistent with various embodiments of the present disclosure by using a cell phone as an example only. The cell phone may have a front display and a side display function, corresponding to the first display region A1 and the second display region A2. A front of the cell phone may be a main display region. Sides of the cell phone may be auxiliary display regions, and may display icon images including power percentages and buttons. Users' experiences may be improved.

For description purposes only, the present disclosure is explained by using a cell phone illustrated in FIG. 25 as an example only, and has no limit on a type of the display device. For example, in various embodiments, the display device may be a tablet, a TV, or any other display instrument with a display function.

Figure 11:
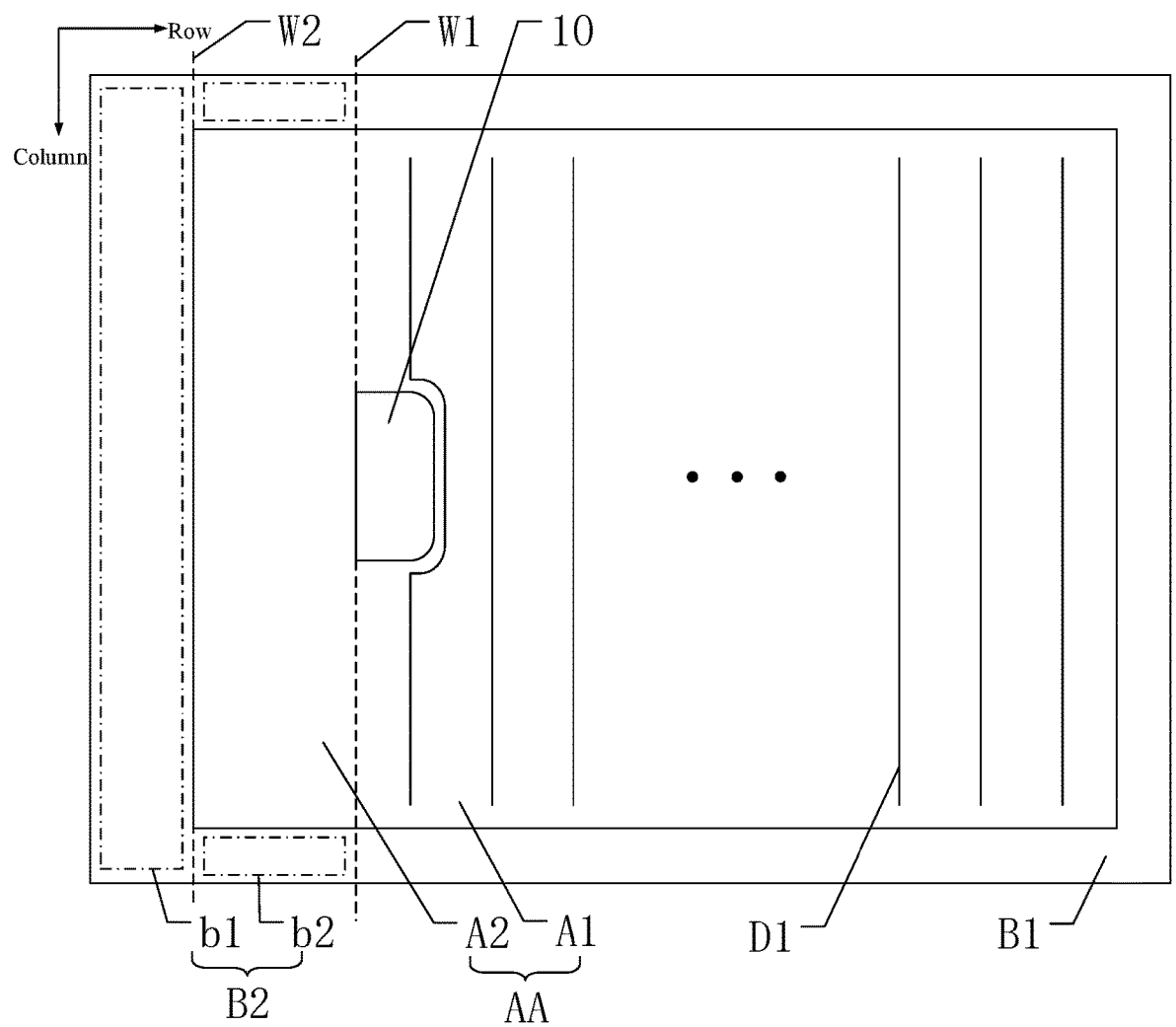
FIG. 11 illustrates another exemplary display panel consistent with various disclosed embodiments in the present disclosure.
Figure 26:
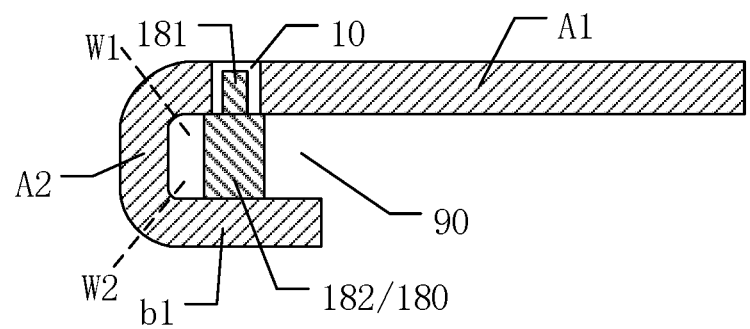
FIG. 26 illustrates a cross-section view of a display device in FIG. 25 consistent with various disclosed embodiments in the present disclosure, along the N-N direction.

In some embodiments, as illustrated in FIG. 11, FIG. 25 and FIG. 26, the first display region A1 and the second display region A2 may be bent along the first bending axis W1, to form an installation groove 90. The installation groove 90 may be connected to the notch 10. The display device may further include a camera module 180 with a lens module 181 and a support module 182. The support module 182 may be disposed in the installation groove 90 and the lens module 181 may be disposed in the notch 10.

In various embodiments of the present disclosure, the installation groove 90 may be formed by bending the first display region A1 and the second display region A2 along the first bending axis W1. The support module 182 of the camera module 180 may be disposed in the installation groove 90, to support the lens module 181 disposed in the notch 10. A shift of the lens module 181 when manufacturing the display panel may be avoided, and a photo effect of the lens module 181 may be improved.

The second bending axis W2 may be disposed between the second display region A2 and the first sub-region b 1. The first sub-region b 1 may support the support module 182 of the camera module 180, after the second display region A2 and the first sub-region b 1 are bent along the second bending axis W2. An extra support component for the support module 182 may be avoided, a stability of the camera module 180 may be improved. The first sub-region b1 is a non-display region, and a display in the second display region A2 may not be interfered, and a display performance of the display device may be improved.

To illustrate various embodiments of the present disclosure more directly, other structures of the display panel are not shown in FIG. 26.

In one embodiment, a space between the support module 182 and the installation groove 90 may be filled with a flexible insulating material. The support module 182 may be fixed in the installation groove 90 and may not move.

Figure 27:
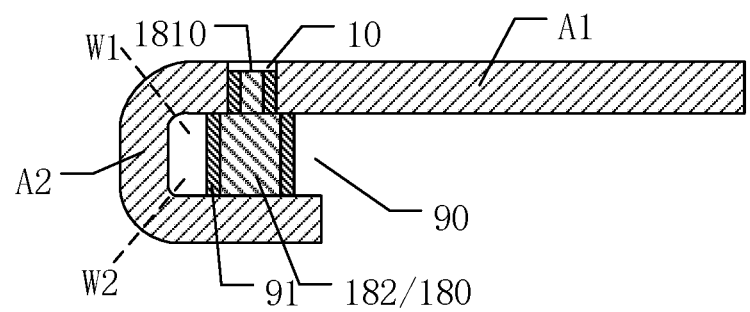
FIG. 27 illustrates another cross-section view of a display device in FIG. 25 consistent with various disclosed embodiments in the present disclosure, along the N-N direction.

A filling amount of the flexible insulating material 91 in the installation groove 90 may be configured according to actual requirements. In one embodiment, as illustrated in FIG. 27, a layer of the flexible insulating material 90 with a certain thickness may be disposed on side surfaces of the support module 182. An amount of the flexible insulating material 90 may be reduced when fixing a position of the support module 182. A production cost may be reduced.

In various embodiments, the flexible insulating material may be a rubber, a soft photoresist, a flexible polymer material, or any combination thereof. The flexible insulating material also may be other flexible insulating materials and the present disclosure has no limit on this.

To illustrate various embodiments of the present disclosure more directly, other structures of the display panel are not shown in FIG. 27.

In some embodiments, as illustrated in FIG. 27, a surface of the lens module 181 where lens set on may be a first surface 1810, a space between the surfaces of the lens module 181 and the notch 10 may be filled with the flexible insulating material 91.

The first surface 1810 should have a good light transmission effect since the lens are disposed on the first surface 1810 of the lens module 81 and lights has to transmit the first surface 1810 to take photos. The first surface 1810 may be covered by a protective glass to prevent a reducing life of the lens module 181 because of environmental waters, dust, or collisions. In one embodiment, a space between the surfaces of the lens module 181 and the notch 10 may be filled with the flexible insulating material 91, to fixing the lens module 181 in the notch 10. A filling amount of the flexible insulating material 91 may be configured according to actual requirements.

Figure 28:
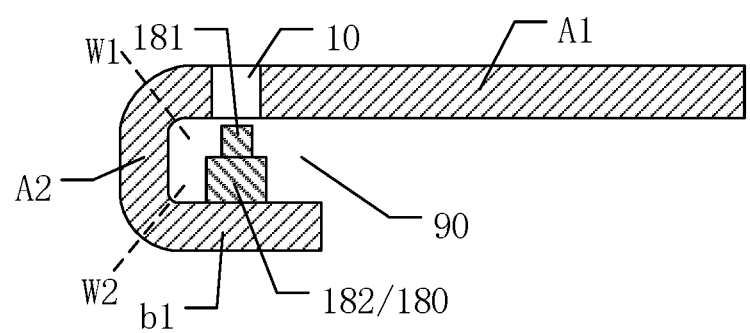
FIG. 28 illustrates another cross-section view of a display device in FIG. 25 consistent with various disclosed embodiments in the present disclosure, along the N-N direction.

In some other embodiments, as illustrated in FIG. 11, FIG. 25 and FIG. 28, the first display region A1 and the second display region A2 may be bent along the first bending axis W1, to form the installation groove 90. The display device may further include the camera module 180 with the lens module 181 and the support module 182. Both support module 182 and the lens module 181 may be disposed in the installation groove 90.

In various embodiments of the present disclosure, the installation groove 90 may be formed by bending the first display region A1 and the second display region A2 along the first bending axis W1. Both support module 182 and the lens module 181 may be disposed in the installation groove 90, while the support module 182 may support the lens module 181. Films layers of the display panel in a region where the notch 10 is disposed may be film layers with a high light transmission rate, to prevent an influence on optic characteristics of the lens module 181.

In some embodiments, the second bending axis W2 may be disposed between the second display region A2 and the first sub-region b 1. The first sub-region b 1 may support the support module 182 and the lens module 181 of the camera module 180, after the second display region A2 and the first sub-region b1 are bent along the second bending axis W2. An extra support component for the support module 182 may be avoided, a stability of the camera module 180 may be improved.

To illustrate various embodiments of the present disclosure more directly, other structures of the display panel are not illustrated in FIG. 28 but would be encompassed in the present disclosure.

In the display panel and the display device provided by various embodiments of the present disclosure, the first bending axis may be disposed in the display panel along the column direction. Correspondingly, the display modes of the display panel may be more diverse, and the display panel may be easier to be stored or carried. The first edge may be recessed toward an inside of the first display region to form the notch. Devices including a camera may be disposes in the notch, and the display functions of the display panel may be more diverse. The plurality of first data lines and the second display region may be disposed on two opposite sides of the notch along the row direction, and a full-screen display may be achieved in the second display region. A display panel with a narrow border may be achieved.

Various embodiments have been described to illustrate the operation principles and exemplary implementations. It should be understood by those skilled in the art that the present invention is not limited to the specific embodiments described herein and that various other obvious changes, rearrangements, and substitutions will occur to those skilled in the art without departing from the scope of the invention. Thus, while the present invention has been described in detail with reference to the above described embodiments, the present invention is not limited to the above described embodiments, but may be embodied in other equivalent forms without departing from the scope of the present invention, which is determined by the appended claims.

What is claimed is:

1. A display panel, comprising:
a display region and at least one notch, wherein:
the display region is divided into a first display region and a second display region by a first bending axis there-between, wherein the first bending axis extends along a column direction;
the first display region includes a first edge and a plurality of first data lines, wherein the first edge and the plurality of first data lines extend along the column direction;
the first edge is recessed toward an inside of the first display region to form the at least one notch in a non-display region located within and surrounded by the display region, wherein the at least one notch and the first display region are on a same side of the first bending axis and the second display region is on another side of the first bending axis away from the at least one notch and the first display region; and
the plurality of first data lines and the second display region are disposed on two opposite sides of the at least one notch along a row direction.

2. The display panel according to claim 1, further including another non-display region, wherein:
the another non-display region includes a first non-display region and a second non-display region;
the first non-display region is disposed at a periphery of the first display region; and
the second non-display region is disposed at a periphery of the second display region.

3. The display panel according to claim 2, wherein:
the first non-display region includes a plurality of first shift registers in a cascade configuration;
the first display region includes a plurality of first scanning lines extending along the row direction; and
an output terminal of each of the plurality of first shift registers is electrically connected to at least one of the plurality of first scanning lines.

4. The display panel according to claim 2, wherein:
the first non-display region includes a first bonding region;
the first bonding region includes a plurality of first conductive soldering pads; and
the plurality of first data lines is electrically connected to the plurality of first conductive soldering pads.

5. The display panel according to claim 2, wherein:
the second non-display region includes a first sub-region and a second sub-region;
the first sub-region and the second sub-region are adjacent to each other along the row direction; and
the first sub-region and the second sub-region are disposed on two opposite sides of the second display region along the column direction respectively.

6. The display panel according to claim 5, wherein:
a second bending axis extending along the column direction is disposed between the first sub-region and the second display region.

7. The display panel according to claim 5, wherein:
the first sub-region includes a second bonding region;
the second bonding region includes a plurality of second conductive soldering pads;
the another non-display region further includes a plurality of first connection lines; and
in each of the plurality of first connection lines, one end is electrically connected to one of the plurality of first data lines, and another end is electrically connected to one of the plurality of second conductive soldering pads.

8. The display panel according to claim 7, wherein:
the second display region includes a plurality of second data lines;
the plurality of second data lines extends along the column direction or the row direction;
the second non-display region includes a plurality of second connection lines; and
in each of the plurality of second connection lines, one end is electrically connected to one of the plurality of second data lines, and another end is electrically connected to one of the plurality of second conductive soldering pads.

9. The display panel according to claim 8, wherein:
the second display region further includes a plurality of second scanning lines;
an extending direction of the plurality of second scanning lines crosses an extending direction of the plurality of second data lines;
the second non-display region further includes a plurality of second shift registers in a cascade configuration; and
an output terminal of each of the plurality of second shift registers is electrically connected to at least one of the plurality of second scanning lines.

10. The display panel according to claim 2, wherein the another non-display region further includes a third non-display region between the first display region and the second display region.

11. The display panel according to claim 10, wherein the third non-display region is adjacent to the first edge along the row direction.

12. The display panel according to claim 10, wherein the third non-display and the first edge are disposed on two opposite sides of the at least one notch along the row direction.

13. The display panel according to claim 1, wherein:
the first display region further includes a plurality of first touch electrodes and a plurality of first touch lines; and
each of the plurality of first touch electrodes is electrically connected to at least one of the plurality of first touch lines, and is insulated from other of the plurality of first touch lines.

14. The display panel according to claim 1, wherein:
the second display region further includes a plurality of second touch electrodes and a plurality of second touch lines; and
each of the plurality of second touch electrodes is electrically connected to at least one of the plurality of second touch lines, and is insulated from other of the plurality of second touch lines.

15. The display panel according to claim 1, wherein:
along the column direction, the first display region has a length L1 and the second display region has a length L2, wherein L2 is less than or equal to L1.

16. The display panel according to claim 1, wherein:
the at least one notch penetrates at least a portion of film layers of the display panel, along a direction perpendicular to the display panel.

17. The display panel according to claim 16, wherein:
the at least one notch penetrates the display panel, along the direction perpendicular to the display panel.

18. A display device, comprising:
a display panel, comprising:
a display region and at least one notch;
wherein:
the display region is divided into a first display region and a second display region by a first bending axis there-between, wherein the first bending axis extends along a column direction;
the first display region includes a first edge and a plurality of first data lines, wherein the first edge and the plurality of first data lines extend along the column direction;
the first edge is recessed toward an inside of the first display region to form the at least one notch in a non-display region located within and surrounded by the display region, wherein the at least one notch and the first display region are on a same side of the first bending axis and the second display region is on another side of the first bending axis away from the at least one notch and the first display region; and
the plurality of first data lines and the second display region are disposed on two opposite sides of the at least one notch along a row direction respectively.

19. The display device according to claim 18, wherein:
the first display region and the second display region are bent along the first bending axis to form an installation groove;
the installation groove is connected to the at least one notch;
the display device further includes a camera module;
the camera module includes a lens module and a support module; and
the lens module is disposed in the at least one notch and the support module is disposed in the installation groove.

20. The display device according to claim 18, wherein:
the first display region and the second display region are bent along the first bending axis to form an installation groove;
the installation groove is connected to the at least one notch;
the display device further includes a camera module;
the camera module includes a lens module and a support module; and
both of the lens module and the support module are disposed in the installation groove.

* * * * *